(12) United States Patent
Kida et al.

(10) Patent No.: US 6,271,850 B1
(45) Date of Patent: Aug. 7, 2001

(54) IMAGE GENERATION APPARATUS, IMAGE GENERATION METHOD, IMAGE GENERATION PROGRAM RECORDING MEDIUM, IMAGE COMPOSITION APPARATUS, IMAGE COMPOSITION METHOD, AND IMAGE COMPOSITION PROGRAM RECORDING MEDIUM

(75) Inventors: Mitsuteru Kida, Osaka; Tadashi Kobayashi, Ootsu; Akio Nishimura, Sakai; Minobu Abe, Hirakata, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/179,869

(22) Filed: Oct. 28, 1998

(30) Foreign Application Priority Data

Oct. 28, 1997 (JP) ................................................ 9-295123
Jan. 27, 1998 (JP) ................................................ 10-014408

(51) Int. Cl.[7] ................................................ G06T 17/00
(52) U.S. Cl. ................................... 345/422; 345/419
(58) Field of Search ................................. 345/418, 419, 345/421, 422, 420

(56) References Cited

U.S. PATENT DOCUMENTS

| | | | |
|---|---|---|---|
| 5,579,455 | * 11/1996 | Greene et al. | 345/419 |
| 5,579,456 | * 11/1996 | Cosman | 345/419 |
| 5,581,671 | * 12/1996 | Goto et al. | 345/419 |
| 6,046,746 | * 4/2000 | Deering | 345/422 |
| 6,088,035 | * 7/2000 | Sudarsky et al. | 345/422 |
| 6,104,407 | * 8/2000 | Aleksic et al. | 345/422 |

FOREIGN PATENT DOCUMENTS 2 278 524    11/1994   (GB).
97/41536     11/1997   (WO).

OTHER PUBLICATIONS

Winner et al., Hardware Accelerated Rendering Of Anti-aliasing Using A Modified A–buffer Algorithm, Mar. 8, 1997, pp. 307–316.

Mammen et al., Transparency and Antialiasing Algorithms Implemented with the Virtual Pixel Maps Technique, Jul. 1989, pp. 43–55.

* cited by examiner

*Primary Examiner*—Mark Zimmerman
*Assistant Examiner*—Cliff N. Vo
(74) *Attorney, Agent, or Firm*—Wenderoth, Lind & Ponack, L.L.P.

(57) ABSTRACT

The present invention provides an image generation/composition apparatus and method capable of performing an anti-aliasing process or translucency process, and capable of obtaining a high quality image from shape data comprising coordinate values representing a three-dimensional shape without requiring an increase in cost.

14 Claims, 18 Drawing Sheets

Fig.5 (a)

| input value | degree of contribution |
|---|---|
| 0000 | 0 |
| 0001 | 64 |
| 0010 | 64 |
| 0011 | 128 |
| 0100 | 64 |
| 0101 | 128 |
| 0110 | 128 |
| 0111 | 192 |

| input value | degree of contribution |
|---|---|
| 1000 | 64 |
| 1001 | 128 |
| 1010 | 128 |
| 1011 | 192 |
| 1100 | 128 |
| 1101 | 192 |
| 1110 | 192 |
| 1111 | 255 |

Fig.5 (b)

| input value | selected subpixel |
|---|---|
| 0000 | 0 |
| 0001 | 0 |
| 0010 | 1 |
| 0011 | 1 |
| 0100 | 2 |
| 0101 | 2 |
| 0110 | 2 |
| 0111 | 1 |

| input value | selected subpixel |
|---|---|
| 1000 | 3 |
| 1001 | 3 |
| 1010 | 1 |
| 1011 | 1 |
| 1100 | 2 |
| 1101 | 2 |
| 1110 | 2 |
| 1111 | 2 |

Fig.11

| cycle | comparison result | FIFO write | FIFO read | level control signal |
|---|---|---|---|---|
| 0 | — | 1 | 0 | — |
| 1 | A > B | 1 | 1 | 0 |
| 2 | A ≦ B | 1 | 0 | 0 |
| 3 | A > B | 1 | 1 | 1 |
| 4 | A ≦ B | 0 | 0 | 1 |

| cycle | comparison result | FIFO write | FIFO read | level control signal |
|---|---|---|---|---|
| 0 | — | 1 | 0 | — |
| 1 | A ≦ B | 1 | 0 | 0 |
| 2 | A ≦ B | 0 | 0 | 1 |
| 3 | A > B | 1 | 1 | 2 |
| 4 | A > B | 0 | 1 | 2 |

IMAGE GENERATION APPARATUS, IMAGE GENERATION METHOD, IMAGE GENERATION PROGRAM RECORDING MEDIUM, IMAGE COMPOSITION APPARATUS, IMAGE COMPOSITION METHOD, AND IMAGE COMPOSITION PROGRAM RECORDING MEDIUM

FIELD OF THE INVENTION

The present invention relates to an image generation apparatus, an image generation method, an image generation program recording medium, an image composition apparatus, an image composition method, and an image composition program recording medium. Particularly, the present invention relates to an image generation apparatus and an image generation method for generating an image from shape data comprising coordinate values representing a three-dimensional shape, and an image generation program recording medium. The present invention also relates to an image composition apparatus and an image composition method for compositing a generated image and a photo image, and an image composition program recording medium.

BACKGROUND OF THE INVENTION

In recent years, three-dimensional computer graphics techniques for generating a three-dimensional image seen from an arbitrary point based on shape data of an object represented by three-dimensional coordinates have been extremely important in fields such as article design or simulation of physical events. Further, techniques for compositing an image generated by the use of the three-dimensional computer graphics techniques, and a photo image have been effective in fields of video production such as television broadcasting, cinema, and the like. A description will now be given of an image generation apparatus and an image composition apparatus which have been employed for such use, according to a prior art.

First, a description will be given of an image generation apparatus for generating an image based on three-dimensional shape data. A general image generation apparatus illustrated herein according to the prior art, handles an object to be displayed as a plane polygon (in many cases "triangle") called "polygon", and uses shape data described as three-dimensional coordinates.

FIG. 17 is a block diagram showing an image generation apparatus according to a prior art. Turning to FIG. 17, this image generation apparatus comprises a shape data buffer 1701, a pixel generating unit 1702, a Z buffer 1103, a frame buffer 1704, and an image display 1705. The shape data buffer 1701 holds shape data input to the image generation apparatus. As mentioned previously, the shape data is described as the three-dimensional data representing the polygon. The pixel generating unit 1702 sequentially reads shape data for each polygon held in the shape data buffer 1701, divides the read data in display pixel units, and finds a display color of each display pixel as a pixel value (R, G, B). The pixel generating unit 1702 performs an operation according to a formula considering a view point, to find a depth value (Z value) indicating a position on a display screen as depth in the direction of line of sight.

Algorithms for deciding the value of the pixel to be generated, includes "flat shading" in which all the pixels belonging to the same polygon have the same value, and "smooth shading" for calculating a value for each pixel belonging to the same polygon according to a formula considering environmental capabilities such as a light source, and the like. The flat shading is a simple algorithm, arid Therefore reduces processing burden. However, since the flat shading makes it difficult to obtain a display image having smooth and fine shades, the smooth shading is generally used to obtain a realistic and high-quality image. Such processing is described in detail in "Computer Graphics PRINCIPLES AND PRACTICES, Foley, by van dam, Feiner, Hughes, ADDISON-WESLEY PUBLISHING COMPANY (1990)".

The pixel generating value unit 1702 is implemented by software by using a general-purpose processor, although it may be implemented by dedicated hardware. Moreover, the dedicated hardware is commonly implemented by an IC (integrated circuit). In this case, the IC includes a control function for reading data from the frame buffer 1704 which is mentioned later, and a D/A conversion function. The Z buffer 1703 and the frame buffer 1704 in FIG. 17 hold the depth value (Z value) and the pixel value (R, G, B), respectively. The Z buffer 1703 holds Z values of display pixels and the frame buffer 1704 holds pixel values (R, G, B) of the display pixels.

In computer graphics process which handles a display object as a polygon, "hidden-surface" process which prevents an invisible part or an invisible object seen from a certain view point from being displayed, improves reality. The image generation apparatus uses a "hidden-surface" method termed a "Z buffer method". In the process according to the Z buffer method, a Z value of a polygon previously processed is held in the Z buffer, which is compared to a Z value of a polygon to be processed, to decide whether or not the polygon to be processed is positioned in front, thereby deciding whether or not the polygon should be displayed. In the image generation apparatus in FIG. 17, comparison is made between the Z value of the polygon generated by the pixel generating unit 1702 and the Z value of the corresponding pixel of the previously processed polygon held in the Z buffer 1703. When the Z value of the polygon is smaller that that of the pixel, the Z value held in the Z buffer is replaced by the Z value of the polygon, and then the value held in the frame buffer 1704 is replacedby the pixel value of the polygon. A smaller Z value indicates a smaller depth, and therefore the above processing can display the polygon to be seen from a certain view point and can eliminate the polygon which cannot be seen therefrom without being displayed.

For the hidden-surface method, algorithms other than the Z buffer method is possible. For example, there is a conventional "depth sorting method". In the depth sorting method, all the polygons are rearranged in the order of depth, and then pixel values of the polygons are written to a frame buffer (in increasing or decreasing order of depth). An advantage of this method is that a memory as a buffer (Z buffer) for holding depth values is dispensed with. However, processing amount of rearrangement is greatly increased with an increase in the number of polygons, since "order" of the number of polygons n is $n^2$ or $n \times \log n$. The Z buffer method is suitable for handling many polygons rather than the depth sorting method. To obtain high-speed by the concurrent execution of such processing, the-Z buffer method is effective, because it can perform individual processing in parallel for each polygon.

In general, the image display 1705 is a CRT (cathode ray tube) monitor, and displays an image generated by the image generation apparatus. In some uses of the image generation apparatus, a monitor or the like as the image display 1705 may be replaced by video editing equipment.

When the shape data, i.e., the three-dimensional coordinates are input to the image generation apparatus so constructed, the shape data is first held in the shape data buffer 1701. The pixel generating unit 1702 reads shape data for each polygon from the shape data buffer 1701, and generates the pixel value and the depth value as mentioned previously. The pixel generating unit 1702 makes a comparison between the generated Z value and the Z value of the corresponding pixel of the previously processed polygon, and then rewrites a content of the Z buffer 1703 when the generated value is smaller.

After rewriting, the generated pixel value (R, G, B) is output to the frame buffer 1704, followed by rewriting a content thereof.

The pixel values held in the frame buffer 1704 are read in the order of the corresponding pixels, and displayed on the image display 1705. Alternatively, the pixel values may be first subjected to D/A conversion process and then output to the image display 1705.

The prior art image generation apparatus is thus capable of generating an image which can be displayed in a three-dimensional manner, by the use of the Z buffer which performs hidden-surface method according to the Z buffer method.

Disadvantages of the Z buffer method are that "anti aliasing" process is difficult and representation of transparent objects is difficult because it determines the algorithm from the depth value. Accordingly, there have been problems associated with the prior art image generation apparatus which uses the Z buffer method, that is,"1. Problems With Anti Aliasing Process" and "Problems with Handling Translucent Objects", which will be described below.

"1. Problems With Anti Aliasing Process"

In a case where the prior art image generation apparatus so constructed generates a computer graphics image, all the display pixels displays a specific polygon, that is, they belong to the specific polygon. At a boundary between polygons, a pixel belonging to a polygon has a value significantly different from a value of a pixel belonging to another polygon which is adjacent to the former pixel. For instance, in a case where an image is displayed in a resolution of a normal TV screen, a size of a pixel is recognizable by a viewer who sees the image. Therefore, in the case where the values of pixels significantly differ from each other, luminance greatly changes at the boundary, which becomes conspicuous. As a consequence, "jaggy" occurs at boundaries of oblique lines or curved lines, which makes it impossible to realize smooth display, causing degraded image quality.

FIGS. 18(*a*) and 18(*b*) show such phenomenon and anti aliasing process as measures against it. FIG. 18(*a*) shows that the "jaggy" damages the display. At a boundary between an upper white polygon and a lower black polygon, there are steps. To avoid this, as shown in FIG. 18(*b*), colors of these upper and lower polygons at the boundary may be mixed. The mixing ratio is made directly proportional to areas of each polygon in each pixel. This processing is the anti aliasing process for improving image quality.

FIG. 19 shows such anti aliasing process. To find the mixing ratio for use by the anti aliasing process, a display pixel is divided into "sub-pixels" as units, and a polygon is detected for each sub-pixel. In the example shown in FIG. 19, a pixel is divided into 16 sub-pixels (4×4 sub-pixels). In sub-pixels in a region represented by oblique lines and sub-pixels in another region, different polygons are present. The mixing ratio is the number of sub-pixels/ a pixel. For example, for a pixel present in a lower-rightmost position (16 sub-pix ls), the mixing ratio of the polygon in the region represented by oblique lines (9 sub-pixels )is 9/16.

In this method, the more sub-pixels a pixel is divided into, the closer to the area ratio of the polygon the mixing ratio becomes. In the hidden-surface method by the use of the Z buffer, there is no problem with algorithm as long as anti aliasing process is carried out by using sub-pixel division. However, such anti aliasing process requires Z buffers and frame buffers for all the sub-pixels on a display screen, and correspondingly requires a large memory capacity.

For instance, suppose that the Z value is 24 bits, each of the R value, the G value, and the B value is 8 bits, and the display screen is composed of (1024×512) pixels. In this case, the Z buffer and the frame buffer must respectively have a memory capacity of 1.5 Mbytes, which amounts to 3 Mbytes in total. If a pixel is divided into 16 sub-pixels as shown in FIG. 19 under the same condition, 48 M bytes (3 M×16) is required.

The increase in the memory capacity leads to cost-up, and hence in the prior art image generation apparatus, generation of smoothly displayed images is not compatible with a reduction of cost.

"Problems with Handling Translucent Objects"

There are many methods which represent translucent objects such as a color glass by using computer graphics image generation. For the case of handling this kind of object, a parameter called "degree of transparency" is set in shape data, and the degree of transparency is given to each polygon, for representation. As the degrees of transparency, numeric values 0–255 are used. In this case, a value "255" indicates that the corresponding object is opaque, a value "0" indicates that the corresponding object is completely transparent (invisible), and an intermediate value indicate that a degree of transparency varies according to the value.

As concerns a pixel on a display screen, when a polygon having the smallest Z value, of plural polygons including the pixel, is translucent, that is, the degree of transparency is not 255, a display color of the pixel is obtained by mixing a display color of the polygon and a display color of a polygon having the second smallest value according to the degree of transparency. If the polygon having the second smallest Z value is translucent, a display color of a polygon having the third smallest Z value must be used.

However, in the hidden-surface process by the use of the Z buffer, coordinates closest to a view point, i.e., coordinates having small depth, are selected, and therefore only the display color of the polygon having the smallest Z value is held in the frame buffer. Mixing process for plural polygons becomes impossible with a simple frame buffer and a Z buffer in FIG. 17.

Use of plural frame buffers and Z buffers can realize hidden-surface process by the Z buffer method, and mixing process which represents a translucent object, for the case of overlapped polygons having degrees of transparency.

FIG. 20 shows process which uses plural buffers. In the example in FIG. 20, 4 frame buffers, and 4 Z buffers are shown. Z buffers 2011, 2012, 2013, and 2014, hold the smallest Z value, the second smallest Z value, the third smallest Z value, and the fourth smallest value, respectively. Frame buffers 2021, 2022, 2023, and 2024 hold values (R, G, B) of the corresponding Z buffers 2011–2014. In addition, transparency-degree buffers 2C31, 2032, 2033, and 2034 for holding degrees of transparency for respective pixels are used to perform the mixing process for each pixel.

This construction in FIG. 2C is capable of performing process considering the degrees of transparency, which increases a memory capacity required in proportion to the number of the frame buffers and the Z buffers.

Moreover, in order to realize anti aliasing process and representation of the translucent object simultaneously, a necessary memory capacity becomes a product of increases in these capacities, causing added cost-up. In the example shown, memory of 192 Mbytes, i.e., (a memory capacity of display pixels 3 M bytes)×64 (=16 times×4 times) is required.

As should be appreciated, the problem with the prior art is that the preferable image display is not compatible with a reduction of cost.

Subsequently, a description will be given of a prior art image composition apparatus for compositing the image generated by the three-dimensional computer graphics and the photo image.

FIG. 21 shows a general image composition apparatus according to the prior art Turning to FIG. 21, the image composition apparatus comprises an image generating unit 2101, a depth composition unit 2102, a pixel mixing unit 2103, a composition key processing unit 2104, an image composition unit 2105, and an image display 2106. The image generating unit 2101, the depth composition unit 2102, and the pixel mixing unit 2103, constitute a CG generating unit 2110.

The CC generating unit 2110 receives shape data described as three-dimensional coordinates representing a polygon as an input, and generates a CG image by a computer graphics process. Suppose that the CG generating unit 2110 includes plural buffers to perform anti aliasing process and translucency process, as already described by the use of the prior art image generation apparatus.

In this example, the CC generating unit 2110 comprises the image generating unit 2101, the depth composition unit 2102, and the pixel mixing unit 2103, for performing anti aliasing process and the like. This construction requires a large memory capacity as described above. As in the case of the prior art image generation apparatus in FIG. 17, the apparatus may comprise the shape data buffer, the pixel generating unit, the Z buffer, and the frame buffer, and the anti aliasing process may dispensed with.

The image generating unit 2101 sequentially processes input shape data, to generate a pixel value (R, G, B) and a depth value (Z value) for each pixel. In anti-aliasing process, a pixel is divided into sub-pixels, and a mixing ratio is calculated. In translucency process, the degree of "transparency" is used.

The depth composition unit 2102 performs hidden-surface process according to the Z buffer method. For the anti aliasing process and the translucency process, there are provided plural Z buffers and frame buffers, and plural mixing ratio buffers and transparency-degree buffers as required, to perform the processing in FIG. 20. To be specific, 4 buffers are provided for translucency process as in the case shown in FIG. 2a. Besides, the transparency-degree buffers may be replaced by the mixing ratio buffers, to perform anti aliasing process, thereby performing the processing in FIG. 20.

The pixel mixing unit 2103 performs a mixing process by the use of the pixel value (R, G, B), according to the degree of transparency or the mixing ratio, to generate a value of a pixel to-be-displayed, which is held in the frame buffer. As the Z value of the generated image, the unit 2103 fetches the smallest Z value from the Z buffer, and outputs it to the image composition unit 2105.

The CG image so processed by the CG generating unit 2110 and the photo image are composited by a chromakey method. This method employs difference between hues to generate a chromakey signal, i.e., a sampled signal, and performs composition by fitting another frame into the portion. For instance, an image of a specific object (human being or a car) is taken with a specific color named "chromakey blue" for its background, a portion of the "chromakey blue" is sampled from the resulting image by a prescribed process, and the remaining specific object is overlapped with the background image.

The composition key processing unit 2104 receives the photo image as an input and performs prescribed processing, to generate a chromakey signal and photo image information. The photo image information comprises pixel values (R, G, B) of the photo image. The chromakey signal and the photo image are input to the image composition unit 2105. The depth value (Z value) of the photo image is also input to the image composition unit 2105. The Z value specifies the overlapping relationship of the photo image and the CG image.

The image composition unit 2105 makes a comparison between the Z value of the CG image from the pixel mixing unit 2103 and the Z value of the photo image. When the Z value of the photo image is smaller than that of the CG image, the pixel value held in the frame buffer is replaced by the pixel value included in the photo image, to be held therein. Thereby, the photo image is overlapped with the CG image, to be displayed, when the depth value of the photo image is smaller, that is, the photo image is positioned in front in relation to the CG image. Thereafter, the pixel value held in the frame buffer is read therefrom and is subjected to D/A conversion process, to be displayed on the image display 2106.

Thus, in the prior art image composition apparatus, the CG generating unit 2110 performs anti aliasing process to the CG image to make its "jaggy" inconspicuous, or performs translucency process thereto. However, the following problems occur.

i) Since the anti aliasing process cannot be performed to the photo image and the composite image, the image quality is sometimes degraded. For instance, when the photo image is positioned behind the CG image, its boundary portion looks blurred, resulting in degraded image quality.

ii) Flexible composition process cannot be performed. Assume that the translucency process is performed in the CG generation process, and a CG image in which a translucent object is positioned before an opaque object is obtained. When this CG image and a photo image are composited, although the photo image can be disposed before or after the CG image, it cannot be disposed between the translucent object and the opaque object. In other words, while flexible processing which can use overlapping relationships of the number of levels equal to the number of buffers (4 levels in the example shown in FIG. 20) is possible in CG generation process, such flexible processing is impossible in the process for compositing the CG image and the photo image.

It the image composition apparatus comprises plural CG generating units 2110 in FIG. 21 for such flexible composition process, then the composition process can increase the number of levels equal to the number of CG generating units. An example of such composition process is that a CG image output from a CG generating unit is a background imago of a photo image, and a CG image output from another CG generating unit is disposed before the photo image. As described above, the CG generating unit 2120 corresponds to a main part of the prior art image generation apparatus, and therefore plural generating units significantly increases a cost. In particular, plural buffers must be provided for the anti-aliasing process or the translucency process, which requires a large memory capacity, and hence this is not realistic.

As should be appreciated from the foregoing description, in the prior art image generation apparatus, if the anti aliasing process or the translucency process is performed to obtain improved image quality, a required buffer capacity is increased, and correspondingly its cost is increased.

In addition, the anti aliasing process or the translucency process is not applied to the process for compositing the CG image and the photo image. As a consequence, an image quality is not improved and image processing is not performed flexibly.

SUMMARY OF THE INVENTION

It is an object of the present invention to provide an image generation apparatus which is capable of performing an anti aliasing process or translucency process without significantly increasing an apparatus cost, and can obtain a image of a high quality.

It is another object of the present invention to provide an image generation method which can improve an image quality without increasing an apparatus cost.

It is still another object of the present invention to provide a program recording medium which contains an image generation program which can generate an image of a high quality in a inexpensive system by executing the program in a general purpose computer and the like.

It is a further object of the present invention to provide an image composition apparatus which is capable of performing anti aliasing process or translucency process without increasing an apparatus cost, and can obtain an a image of a high image quality in process for compositing a CG image and a photo image.

It is a still further object of the present invention to provide an image composition method which is capable of performing an anti aliasing process or translucency process without increasing an apparatus cost, and can obtain an image of a high image quality in a process for compositing a Cg image and a photo image.

It is another object of the present invention to provide a program recording medium which contains an image composition program which is capable of generating an image of a high quality in an inexpensive system by executing the program in a general purpose computer.

Other objects and advantages of the present invention will become apparent from the detailed description that follows. The detailed description and specific embodiments described are provided only for illustration since various additions and modifications within the spirit and the scope of the invention will be apparent to those skill in the art from the detailed description.

According to a first aspect of the present invention, an image generation apparatus for generating a three dimensional image based on shape data as a set of polygons, which is represented by three-dimensional coordinates, comprises polygon identification means for identifying each polygon by deciding whether or not it is opaque, for the shape data as the set of polygons; image data calculating means for generating pixel values indicating luminance and color of respective pixels as display units of an image, depth values indicating depth with which polygons to be processed are displayed, and degrees of contribution indicating ratios of the polygons to be processed to pixels, from the shape data; temporal storage means for temporarily storing the pixel values, the depth values, and the degrees of contribution which have been generated by the image data calculating means; and image composition means for generating an image to be displayed from the pixel values temporarily stored in the temporal storage means, based on the degrees of contribution and the depth values stored in the temporal storage means. Therefore, the degree of contribution is used in the anti aliasing process for the opaque polygon, and is used in the translucency process for the translucent polygon.

According to a second aspect of the present invention, in the image generation apparatus of the first aspect, the temporal storage means stores plural depth values, further and comprises depth composition means for making comparison between the largest depth value of the plural depth values and the depth value of the polygon to be processed, and deciding whether or not the polygon to be processed is displayed, according to the comparison result. Thereby, plural-level processing is performed.

According Lo a third aspect of the present invention, in the image generation apparatus of the first aspect, the temporal storage means has plural regions, further comprises buffer control means for controlling input/output of data to/from the plural regions in the temporal storage means. Thereby, data is input/output to/from the buffers efficiently.

According to a fourth aspect of the present invention, in the image generation apparatus of the first aspect, the image data calculating means divides one display pixel as a unit of the shape data into (M×M) sub-pixels (M≧2 M: positive integer), samples M sub-pixels from the (M×M) sub-pixels, and decides whether or not the sampled sub-pixels are in the polygon to be processed, to generate the degree of contribution. Thereby, all tie sub-pixels are not processed. As a result, processing burden is reduced and required memory capacity is saved.

According to a fifth aspect of the present invention, in the image generation apparatus of the fourth aspect, the image data calculating means selects the M sub-pixels to be sampled in such a way that they are not present on the same column and on the same row in a pixel. Thereby, a sub-pixel to be sampled represents the corresponding pixel.

According to a sixth aspect of the present invention, in the image generation apparatus of the fifth aspect, the image data calculating means samples sub-pixels in specific positions in all the polygons regardless of whether or not the polygons are opaque. Thereby, sampling process is performed efficiently.

According to a seventh aspect of the present invention, in the image generation apparatus of the second aspect further the invention comprises shape data dividing means for dividing the shape data into plural polygon groups and outputting respective polygon groups as partial shape data; and wherein L (L: positive integer)pieces of the polygon identification means, L pieces of the image data calculating means, and T. pieces of the depth composition means are provided, and wherein the L pieces of depth composition means is connected in series, and depth composition means sequentially transfers outputs from depth composition means at a previous stage thereof to depth composition means at a subsequent stage thereof. Thereby, processing is performed for each polygon group, and concurrent operation realizes speedy processing.

According to an eighth aspect of the present invention, in the image generation apparatus of the seventh aspect, the L pieces of depth composition means each arranges the outputs to be transferred to depth composition means at the subsequent stage thereof in ascending order of the depth values. Thereby, the depth composition means at the subsequent stage thereof is performed efficiently.

According to a ninth aspect of the present invention, an image generation method for generating a three-dimensional image based on shape data as a set of polygons, which is represented by three-dimensional coordinates, comprises a polygon identification step for identifying each polygon by deciding whether or not it is opaque, for the shape data as the set of polygons; an image data calculating step for generating pixel values indicating luminance and color of respective pixels as display units of an image, depth values indicating depth with which polygons to be processed are displayed, and degrees of contribution indicating ratios of the polygons to be processed to pixels, from the shape data; a temporal storage step for temporarily storing the pixel values, the depth values, and the degrees of contribution which have been generated in the image data calculating step; and an image composition step for generating an imagetobe displayed from the pixel values temporarily stored in the temporal storage step, based on the degrees of contribution and the depth values stored in the temporal storage step. Therefore, the degree of contribution is used in the anti aliasing process for the opaque polygon, and is used in the translucency process for the translucent polygon.

According to a tenth aspect of the present invention, an image generation program recording medium for recording an image generation program for generating a three-dimensional image based on shape data as a set of polygons, which is represented by three-dimensional coordinates, comprises a polygon identification step for identifying each polygon by deciding whether or not it is opaque, for the shape data as the set of polygons; an image data calculating step for generating pixel values indicating luminance and color of respective pixels as display units of an image, depth values indicating depth with which polygons to be processed are displayed, and degrees of contribution indicating ratios of the polygons to be processed to pixels, from the shape data; a temporal storage step for temporarily storing the pixel values, the depth values, and the degrees of contribution which have been generated in the image data calculating step; and an image composition step for generating an image to be displayed from the pixel values temporarily stored in the temporal storage step, based on the degrees of contribution and the depth values stored in the temporal storage step. Therefore, the degree of contribution is used in the anti aliasing process for the opaque polygon, and is used in the translucency process for the translucent polygon.

According to an eleventh aspect of the present invention, an image composition apparatus for generating a three-dimensional image based on shape data as a set of polygons, which is represented by three-dimensional coordinates, and compositing the generated image and a photo image, to generate a composite image, the apparatus comprising: polygon identification means for identifying each polygon by deciding whether or not it is opaque, for the shape data as the set of polygons; image data calculating means for generating pixel values indicating luminance and color of respective pixels as display units of an image, depth values indicating depth with which polygons to be processed are displayed, and degrees of contribution indicating ratios of the polygons to be processed to pixels, from the shape data; temporal storage means for temporarily storing the pixel values, the depth values, and the degrees of contribution which have been generated by the image data calculating means; photo image processing means for processing the photo image to generate photo image pixel values indicating luminance and color, and degrees of contribution of the photo image indicating ratios of the photo image to pixels as display units; and image composition means for generating an image to be displayed by the use of the pixel values stored in the temporal storage means and the photo image pixel values generated by the photo image processing means, based on the degrees of contribution and the depth values stored in the temporal storage means, the degrees of contribution of the photo image generated by the photo image processing means, and preset photo image depth values. Thereby, the photo image is processed in the same manner that the generated image is processed.

According to a twelfth aspect of the present invention, in the image composition apparatus of the eleventh aspect the temporal storage means stores plural depth values, further comprises depth composition means for making comparison between the largest depth value of the plural depth values and the depth value of the polygon to be processed, and deciding whether or not the polygon to be processed is displayed, according to the comparison result. Thereby, the photo image is processed in the same manner that the generated image is processed, in process which uses depth values.

According to a thirteenth aspect of the present invention, an image composition method for generating a three-dimensional image based on shape data as a set of polygons, which is represented by three-dimensional coordinates, and compositing the generated image and a photo image, to generate a composite image, comprises a polygon identification step for identifying each polygon by deciding whether or not it is opaque, for the shape data as the sets of polygons; an image data calculating step for generating pixel values indicating luminance and color of respective pixels as display units of an image, depth values indicating depth with which polygons to be processed are displayed, and degrees of contribution indicating ratios of the polygons to be processed to pixels, from the shape data;a temporal storage step for temporarily storing the pixel values, the depth values, and the degrees of contribution which have been generated in the image data calculating step; a photo image processing step for processing the photo image to generate photo image pixel values indicating luminance and color, and degrees of contribution of the photo image indicating ratios of the photo image to pixels as display units; and an image composition step for generating an image .to be displayed by the use of the pixel values stored in the temporal storage step and the photo image pixel values generated in the photo image processing step, based on the degrees of contribution and the depth values stored in the temporal storage step, the degrees of contribution of the photo image generated in the photo image processing step, and preset photo image depth values. Thereby, the photo image is processed in the same manner that the generated image is processed.

According to a fourteenth aspect of the present invention, an image composition program recording medium for recording an image composition program for generating a three-dimensional image based on shape data as a set of polygons, which is represented by three-dimensional coordinates, and compositing the generated image and a photo image, to generate a composite image, comprises a polygon identification step for identifying each polygon by deciding whether or not it is opaque, for the shape data as the sets of polygons; an image data calculating step for generating pixel values indicating luminance and color or respective pixels as display units of an image, depth values indicating depth with which polygons to be processed are displayed, and degrees of contribution indicating ratios of the polygons to be processed to pixels; a temporal storage step for temporarily storing the pixel values, the depth values, and the degrees of contribution which have been generated in the image data calculating step; a photo image processing step for processing the photo image to generate photo image pixel values indicating luminance and color, and degrees of contribution of the photo image indicating ratios of the photo image to pixels as display units; and an image composition step for generating an image to be displayed by the use of the pixel values stored in the temporal storage step and the photo image pixel values generated in the photo image processing step, based on the degrees of contribution and the depth values stored in the temporal storage step, the degrees of contribution of the photo image generated in the photo image processing step, and preset photo image depth values. Thereby, the photo image is processed in the same manner that the generated image is processed, to make a composite image.

BRIEF DESCRIPTION OF THE DRAWINGS

FIGS. 5(a) and 5(b) are diagrams showing a look-up table for use in a process for generating degrees of contribution performed by the image data calculating circuit in the image generating unit of the image composition apparatus of the first embodiment.

FIG. 11 is a diagram showing an example of an operation performed by the Z value comparison circuit in the depth composition circuit of the image composition apparatus of the first embodiment.

DETAILED DESCRIPTION OF THE PREFERRED EMBODIMENTS

[Embodiment 1]

An image generation apparatus according to a first embodiment of the present invention is adapted to divide polygon data into three pieces of data, and perform processing to respective data independently of and concurrently with processing of the other data. The apparatus is adapted to perform anti aliasing process only when the polygon is opaque. Hereinafter, a description will be given of construction and operation of the image generation apparatus of the first embodiment.

Figure 1:
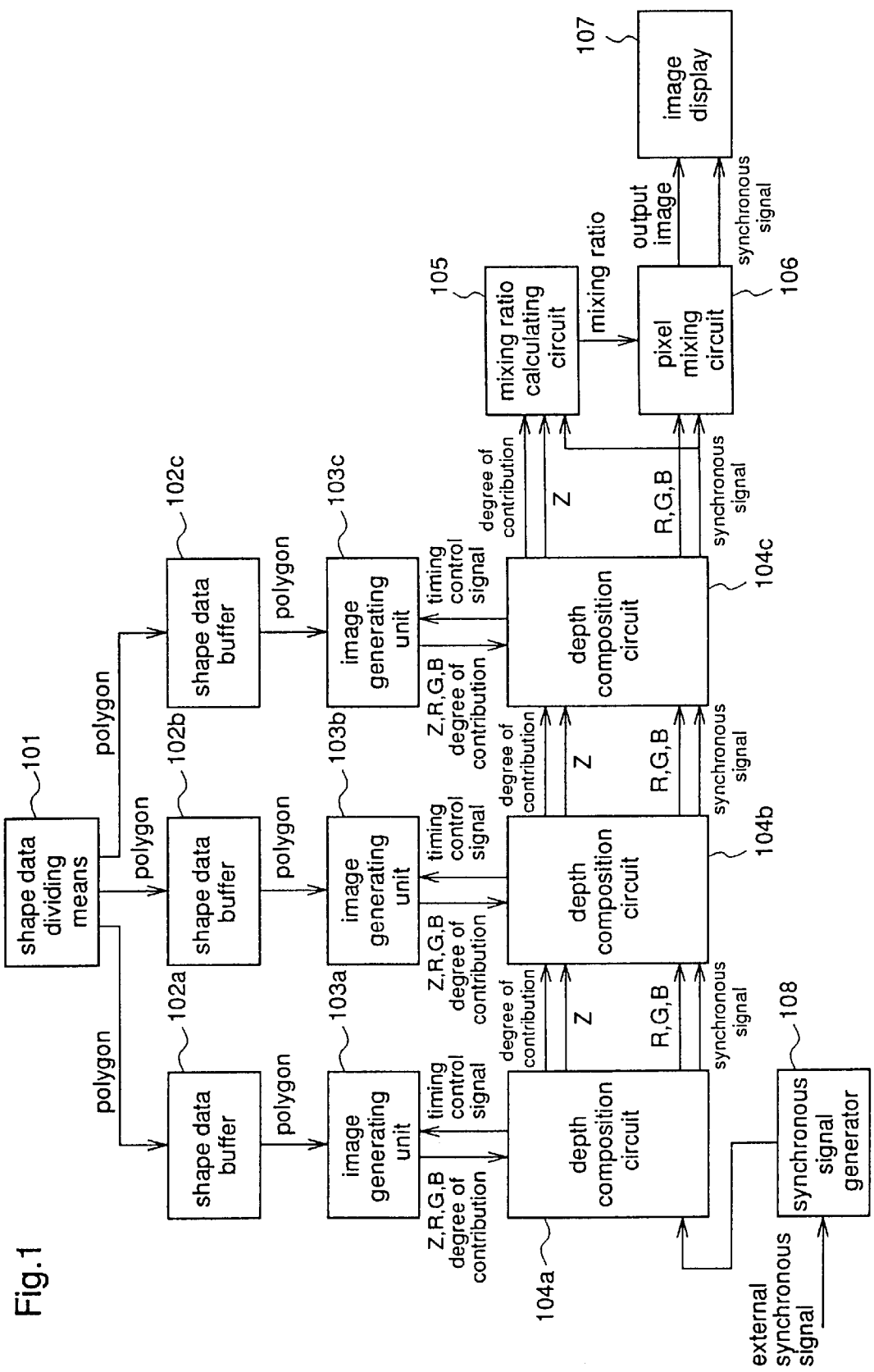
FIG. 1 is a block diagram showing an image composition apparatus according to a first embodiment of the present invention.

FIG. 1 shows the whole structure of the image generation apparatus of the first embodiment. Turning now to FIG. 1, the image generation apparatus comprises shape data dividing means 101, shape data buffers 102a–102c, image generating units 103a–103c, depth composition circuits 104a–104c, a mixing ratio calculating circuit 105, a pixel mixing circuit 106, an image display 107, and a synchronous signal generator 108, and handles an object to-be-displayed as a polygon and uses shape data described as three-dimensional coordinates, as in the case of the prior art image generation apparatus.

The role of the shape data dividing means 101 is to divide data of each of polygons as shape data into three pieces of data to generate three pieces of partial shape data, and output these data to the shape data buffers 102a, 12b, and 102c, respectively, to be held therein.

The role of each of the image generating units 103a, 103b, and 103c is to read polygon data included in each partial shape data held in each of the corresponding shape data buffers 102a, 102b, and 102c therefrom, and process the data to find a Z value and a pixel value (R, G, B) pixel by pixel and to find a "degree of contribution" indicating a ratio of each polygon to the corresponding pixel. In this first embodiment, this degree of contribution is used in anti aliasing process for an opaque polygon, and is used as a degree of transparency for use in the translucency process for another polygon Processing performed by the image generating units 103a, 103b, and 103c is respectively performed independently of the other processing.

The image generating units 103a, 103b, and 103c each comprises a Z buffer, a frame buffer, and a buffer for holding degrees of contribution (hereinafter referred to as contribution-degree buffer). These buffers can hold 4 Z values, 4 pixel values (R, G, B), and 4 degrees of contribution, respectively, per pixel. In respective buffers, 4

Z values, 4 pixel values(R, G, B), and 4 degrees of contribution of 4 polygons are held, in ascending order of their depth values.

The depth composition circuits 104a, 104b, and 104c are linearly connected. In these circuits 104a–104c, comparison is made between a Z value input to a depth composition circuit from a depth composition circuit at a previous stage thereof (in the order of 104a, 104b, and 1C4c), and a Z value input to the circuit from the corresponding image generating unit connected thereto, and according to the comparison result, the Z value, the pixel value (R, G, B), and the degree of contribution are selected and output. To each input port, 4 sets of Z values, pixels values, and degrees of contribution are input per pixel, and therefore 8 sets of values in total are input, among which 4 sets with smaller depth values are selected. It should be remembered that the Z values, the pixel values, and the degrees of contribution which are output from the image generating unit 103a are input to the depth composition circuit 104a at the first stage, and are directly output to the circuit 104b at a subsequent stage thereof. In this first embodiment, these depth composition circuits 104a–104c implement depth composition means.

The mixing ratio calculating circuit 105 is connected to the depth composition circuit 104c at the last stage, for calculating mixing ratios of 4 sets of pixel values (R, G, B) from the degrees of contribution and the Z values, and outputting the calculated ratios to the pixel mixing circuit 106. In this first embodiment, the mixing ratio is used in anti an aliasing process for an opaque polygon, and is used in the translucency process for another polygon. The pixel mixing circuit 106 is connected to the depth composition circuit 104c and the mixing ratio calculating circuit 105, for mixing the pixel values (R, G, B) from the circuit 104c according to the mixing ratios from the calculating circuit 105, to obtain pixel values (R, G, B) of pixels to be displayed. The image display 107 is adapted to display a generated image by the use of the pixel values obtained by the pixel mixing circuit 106. Assume that the image is (1024×512) pixels. In this first embodiment, the mixing ratio calculating circuit 105 and the pixel mixing circuit 106 implement image composition means.

The role of a synchronous signal generator 8 is to generate a synchronous signal in synchronous with an externally input synchronous signal or at a timing when the synchronous signal is not input externally. The synchronous signal passes the depth composition circuits 104a, 104b, and 104c in this order. In the circuits 104a, 104b, and 104c, processing is performed according to the synchronous signal, to perform depth composition process to the same pixel on the display image.

As will be mentioned later, each depth composition circuit is adapted to generate a timing control signal according to the synchronous signal, the timing control signal being output to the corresponding image generating unit, and used therein.

FIGS. 2 through 13 are diagrams each showing an internal structure of each unit of the image generation apparatus of the first embodiment or operation thereof. hereinafter, a description will be given of operation of image generation performed by the image generation apparatus of the first embodiment with reference to FIG. 1 and by means of FIGS. 2 through 13.

When the shape data is input to the image generation apparatus, the shape data is divided into partial shape data (at least one polygon data) by the shape data dividing means 101, which is input to the shape data buffers 102, 102b, and 102c, and held therein, respectively. Polygon data is read from the corresponding buffers 102a–102c by the image generating units 103a, 103b, and 103c, respectively.

Figure 2:
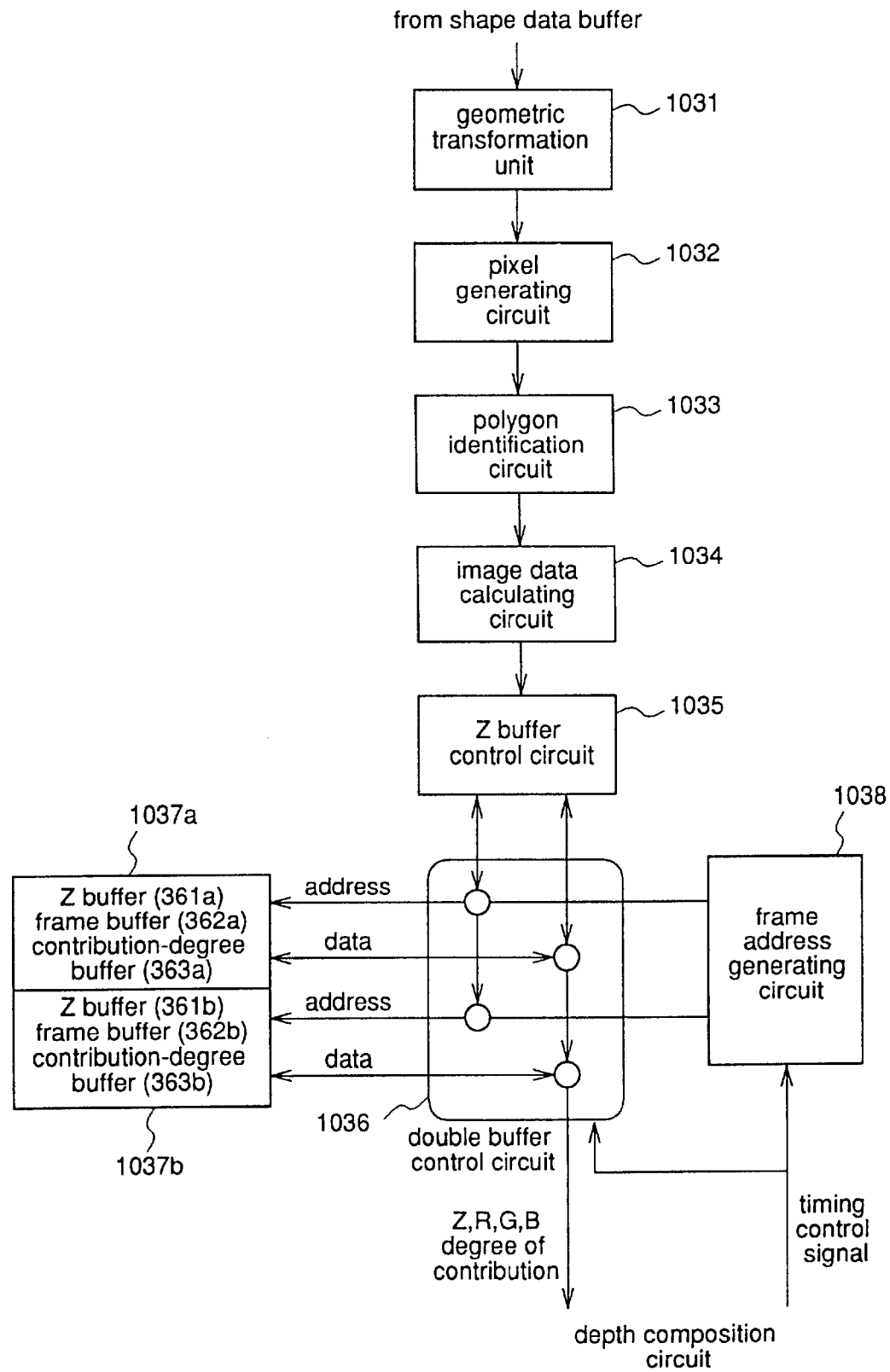
FIG. 2 is a block diagram showing an internal structure of an image generating unit of the image composition apparatus of the first embodiment.

FIG. 2 is a diagram showing an internal structure of the image generating unit 103a. In this first embodiment, the image generating units 103a–103c have the same internal structure. Turning to FIG. 2, the image generating unit 103a (103b or 103c) comprises a geometric transformation unit 1031, a pixel generating circuit 1032, a polygon identification circuit 1033, an image data calculating circuit 1034, a Z buffer control circuit 1035, a double buffer control circuit 1035, first and second buffer groups (Z buffers, frame buffers, contribution-degree buffer)1037a and 1037b, and a frame address generating circuit 1038 The geometric transformation unit 1031 subjects a coordinate system of polygon data read from the shape data buffer to a geometric transformation process. Thereby, the polygon data is converted into a screen coordinate system as a coordinate system on an image to be output. The pixel generating circuit 1032 divides the converted polygon data in sub-pixel units, extracts sub-pixels in the polygon, and generates a pixel value and a Z value for each sub-pixel. The polygon identification circuit 1033 identifies each polygon by deciding whether the polygon is opaque or translucent, according to the output of the pixel generating circuit 1032. The image data calculating circuit 1034 calculates a degree of contribution of each pixel according to a pattern of sub-pixels.

The Z buffer control circuit 1035 reads a Z value of the input screen coordinate value (X, Y) from the Z buffer. The double buffer control circuit 1136 performs control so that one of the first and second buffer groups 1037a and 1037b is controlled by the Z buffer control circuit 1035 and the other is controlled by the frame address generating circuit 1038.

The first and second buffer groups 1037a and 1037b, as shown in FIG. 2, each comprises a Z buffer, a frame buffer, and a contribution-degree buffer, and data is written/read onto/from respective buffers in parallel. Each buffer has 4×(a capacity of display pixels) so that it can hold 4 sets of values for each pixel. Therefore, in each group, the Z buffer has 6 Mbytes (24 bits×1024 pixels×512 pixels×4). Likewise, the frame buffer has a capacity of 6 Mbytes. The contribution-degree buffer has a capacity of 2 Mbytes. The buffer lids its address space of 2 M words, and therefore an address is 21 bits. Of the 21 bits, upper 10 bits (bit 20–bit 12) are Y coordinates, bit 11 to bit 2 are X coordinates, and the least significant 2 bits (bit 1 and bit 0) are indices for holding 4 sets of values.

The frame address generating circuit 1C38 serially generates addresses of the Z buffer, the frame buffer, and the contribution-degree buffer. The synchronous signal output from the synchronous signal generator 108 in FIG. I is input to the depth composition circuit 104a (104b, 104c) where the timing control signal is generated according to the synchronous signal. The timing control signal is input to the image generating unit 103a (103b, 103c), and then input to the frame address generating circuit 1038 therein, where the address is generated in synchronous with this timing control signal.

In this first embodiment, the polygon identification circuit 1033 implements polygon identification means, and the image data calculating circuit 1034 implements the image data calculating means.

A description will be given of operation of the image generating unit 103a (103b, 103c) with reference to FIG. 2.

The polygon data read from the shape data buffer 102a in FIG. 1 is converted into the screen coordinate system as the coordinate system on the image to be output by the geometric transformation unit 1031 in the image generating unit 103a, and output to the pixel generating circuit 1032.

Figure 3:
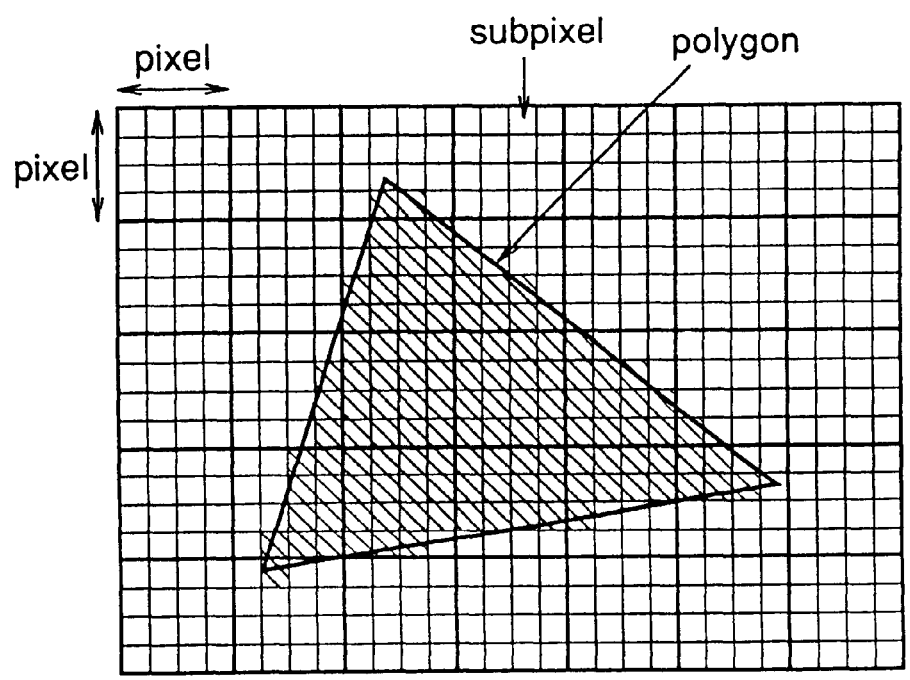
FIG. 3 is a diagram showing a process for dividing a pixel into sub-pixels performed by a pixel generating circuit in the image generating unit of the image composition apparatus of the first embodiment.

The pixel generating circuit 1032 divides the polygon in subbpixel units, and extracts sub-pixels in the polygon. FIG. 3 is a conceptual view for explaining this process. Represented by "pixel" in the upper left portion thereof is one display pixel. FIG. 3 snows a region of (7×5) pixels. A smaller square corresponds to a sub-pixel. In the example shown, one subpixel is divided into 16 (4×4) pixels. The polygon is a triangle represented by bold lines. The sub-pixels in the polygon are represented by oblique lines. The pixel generating circuit 1032 thus divides one pixel into sub-pixels and extracts sub-pixels in the polygon. For all the subbpixels represented by oblique lines, Z values and pixel values (R, G, B) are found. The Z value is 24 bits, and the R value, the G value, or the B value is 8 bits.

In the shape data buffer in FIG. 1, a "degree of transparency" indicating transparency of the polygon is preset. The degree of transparency is 6 bits, and indicates "opaque" when the value is 255 (decimal system), and indicates "transparent" when the value is 0. Intermediate values indicate "translucent" according to their values. Therefore, it is assumed that a polygon whose degree of transparency is 0 is not present.

The pixel generating circuit 1032 outputs the Z value, the value (R, G, B), and the degree of transparency to the polygon identification circuit 1033, which decides whether the polygon is opaque or translucent according to whether or not the value is 255, respectively. The polygon identificationcircuit 1033 outputs an identification result indicating "opaque" or "translucent" to the image data calculating circuit 1034.

Figure 4:
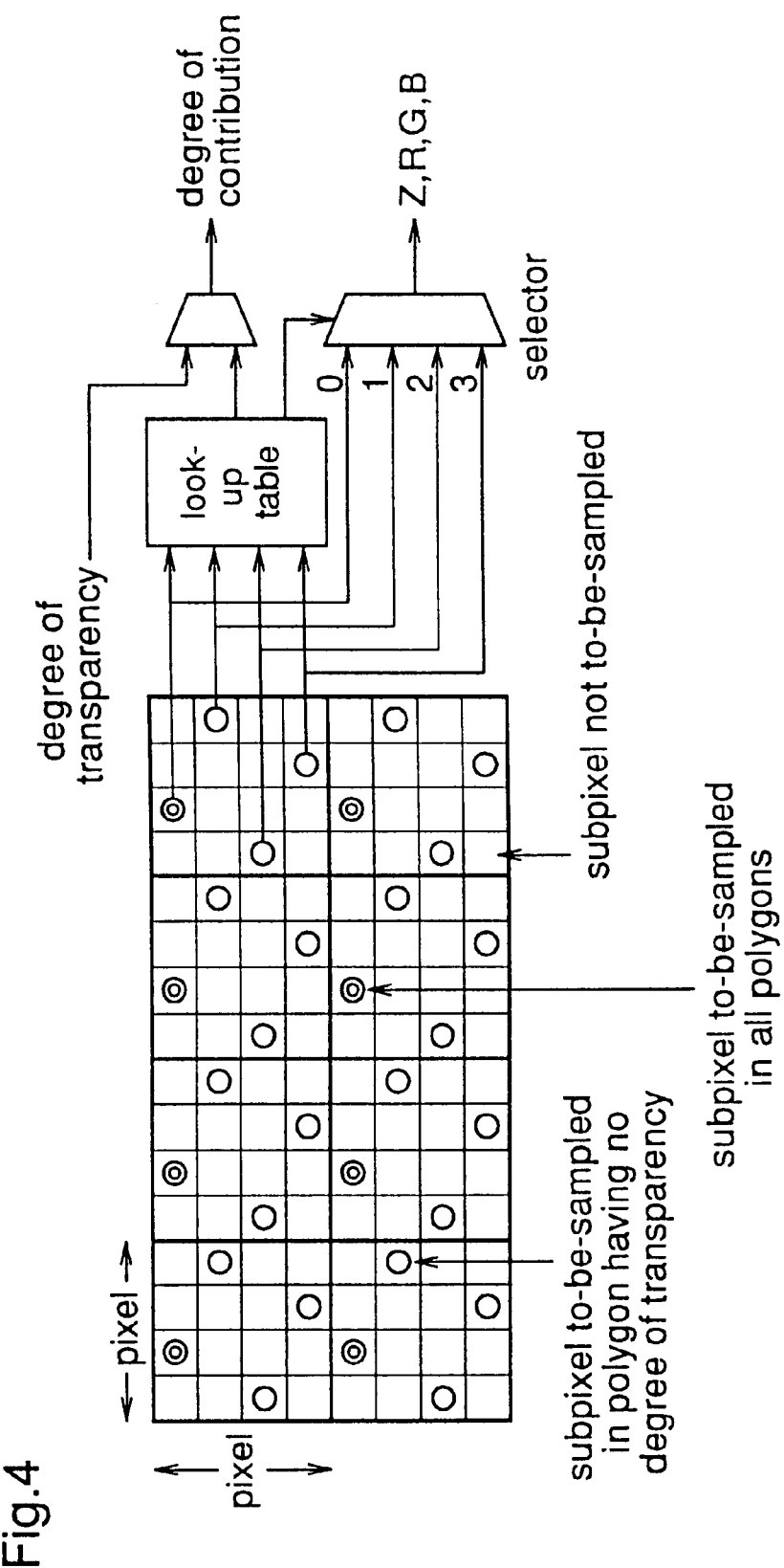
FIG. 4 is a diagram showing a process for generating degrees of contribution performed by an image data calculating circuit in the image generating unit of the image composition apparatus ot the first embodiment.

The image data calculating circuit 1034 calculates a degree of contribution of each pixel from a pattern of the corresponding sub-pixels of the polygon. FIG. 4 shows this processing. Represented by "pixel" in the upper left portion thereof is one display pixel. One display pixel is divided into 16 sub-pixels, and it is decided whether or not respective sub-pixels are in the polygon by the pixel generating circuit 1032. On the other hand, the image data calculating circuit 1034 process a part of the sub-pixels. This process performed by the image data calculating circuit 1034 varies depending upon the identification results "opaque" and "translucent" obtained by the polygon identification means 1033. To be specific, in this first embodiment, anti an aliasing process is performed when the polygon is "opaque".

When the identification result indicates "opaque", the image data calculating circuit 1034 samples 4 sub-pixels from 16 sub-pixels corresponding to one display pixel, and calculates a degree of contribution thereof. In FIG. 4, ⊚ and ○ indicate positions of sub-pixels to be sampled in an opaque polygon.

The image data calculating circuit 1034 calculates a 4-bit value ("1" or "0") of respective sub-pixels. The "1" indicates that a sub-pixel is in the polygon, and "0" indicates that it is not in the polygon. Based on this, the circuit 1034 finds a degree of contribution with reference to a look-up table. FIGS. 5(a) and 5(b) are diagrams showing a look-up table for use by the image data calculating circuit 1034. As shown in FIG. 5(a), the number of bits "1" in binary notation is "0", "1", "2", "3", or "4", the corresponding degree of contribution is "0", "64", "128", "192", or "255", respectively.

When the degree of contribution is not "0", the screen coordinate value (X, Y), and the degree of contribution of the pixel are output to the Z buffer control circuit 1035 (FIG. 2). The image data calculating circuit 1034 also outputs the Z value and the pixel value (R, G, B) to the Z buffer control circuit 1035. Since these values vary sub-pixel by sub-pixel, the image data calculating circuit 1034 selects one of the 4 sub-pixels by the use of a selector. This selection is performed with reference to the look-up table shown in FIG. 5(b). In this table, a value indicating a sub-pixel to-be-selected, is a value indicating a bit position of a bit "1" in binary notation. When plural bits are "1", they indicate a position closer to a center. Selecting a position closer to the center means that a sub-pixel which represents the corresponding pixel is selected with high probability. This processing is for the case where the identification result output from the polygon identification circuit 1033 indicates "opaque". On the other hand, when the result indicates "translucent", only sub-pixels in ⊚ position are sampled. When a sub-pixel in ⊚ position is not in the polygon, and even if the other sub-pixels are in the polygon, the input Z value and the pixel value are abandoned. When the sub-pixel in ⊚ position is in the polygon, the screen coordinate value (X, Y) of the corresponding pixel, the Z value, the pixel value (R, G, B), and the degree of contribution of the sub-pixel in ⊚ position , are output to the Z buffer control circuit 35. For the translucent polygon, the degree of transparency is used as the degree of contribution.

The positions of sub-pixels to be sampled are not limited to those in FIG. 4, and the same effects can be provided by using the different positions. To obtain appropriate results, preferably, sampling is performed in such a way that the sub-pixels are not sampled on a column, on a row, and in an oblique direction.

Turning to FIG. 2 again, the Z buffer control circuit 1035 reads the Z value of the input screen coordinate value (X, Y). A read address of the Z buffer is 21 bits, and the Y coordinate corresponds to bits 20-12, and the x coordinate corresponds to bits 11-2. The least significant 2 bits are indices for distinguishing 4 sets of values per pixel, and vary from 0–3 to read 4 sets of Z values. Comparison is made among these read Z values and the largest Z value is selected. The selected Z value is compared to the Z value input from the image data calculating circuit 1034. When the Z value of the polygon is larger than or equal to the selected Z value, the following processing will not be performed, and the Z value, the (R, G, B) value, and the degree of contribution which have been input are abandoned On the other hand, when the Z value of the polygon is smaller than the selected Z value, the Z value of the polygon is written to the address in which the largest Z value is stored. Simultaneously, to the corresponding addresses in the frame buffer and the contribution-degree buffer, the pixel value (R, G, B) and the degree of contribution of the polygon are written, respectively.

Figure 6:
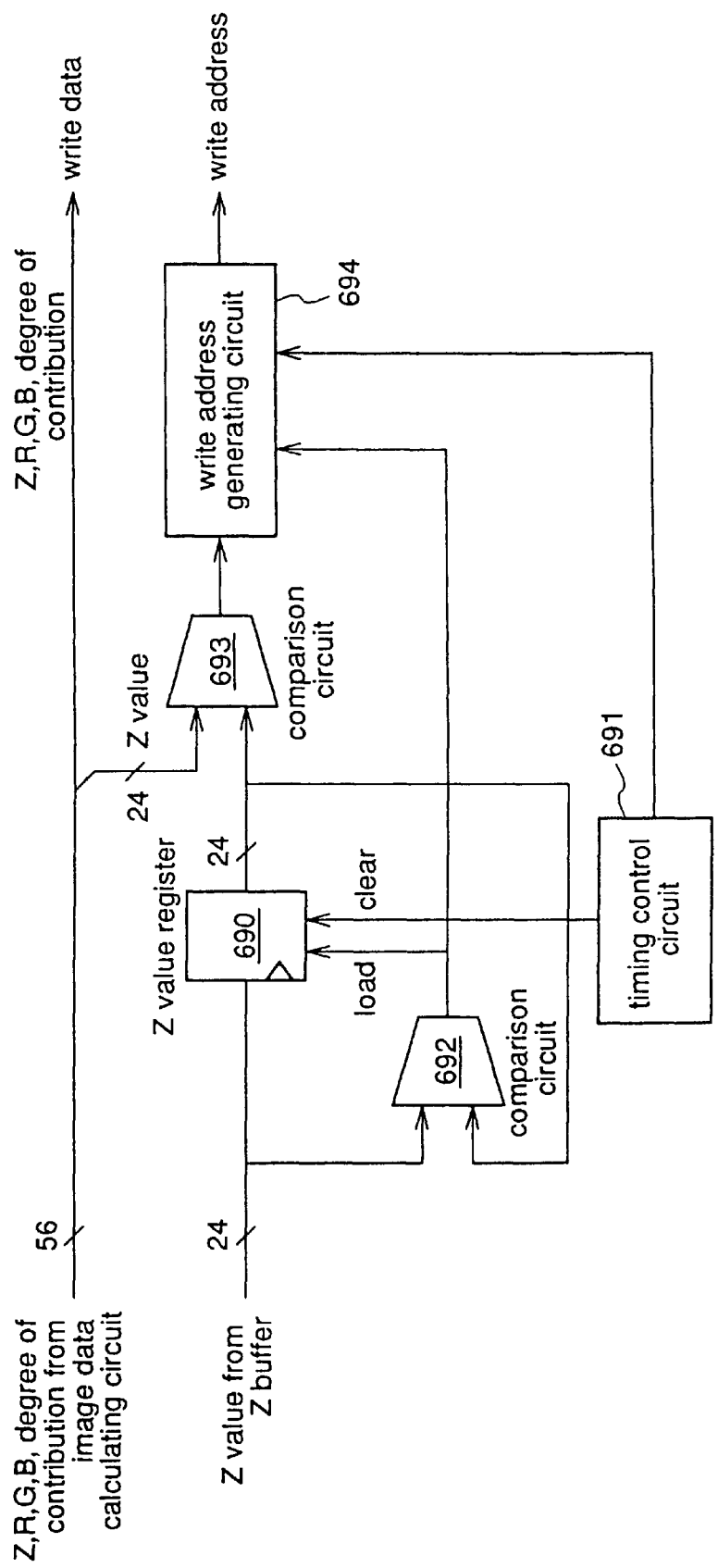
FIG. 6 is a block diagram showing an internal structure of a Z buffer control circuit in the image generating unit of the image composition apparatus of the first embodiment.

FIG. 6 shows a circuit structure of the Z buffer control circuit 1035. As shown in FIG. 6, the Z value, the pixel value (R, G, B) value, and the degree of contribution (56 bits in total) are input to the z buffer control circuit 1035 from the image data calculating circuit 1034, and 4 Z values (24 bits) are sequentially input thereto through the double buffer control circuit 1036. The content of a Z value register 690 is cleared at the timing when the first z value input, and thereafter, a loaded value is held therein untie it is cleared next, under the control of the timing control circuit 691.

The Z value from the z buffer (hereinafter referred to as a buffer Z value) is input to a first comparison circuit 692. The value held in the Z value register 690 (register Z value) is also input to the first comparison circuit 692. The first comparison circuit 692 compares the buffer Z value to the register z value. When the buffer Z value is larger than the register z value, the buffer Z value is loaded into the Z value register 690 from the first comparison circuit 692, and the loaded value is held therein as the register z value.

When 4 Z values have been input from the Z buffer, and the above processing has been performed, the largest Z value of the 4 Z values remains in the Z value register 690 as the register Z value, which is assumed to be the largest register Z value. The largest register Z value is output from the Z value register to a second comparison circuit 693. The Z value (hereinafter referred to as a calculation z value) from the image data calculating circuit 1034 is input to the second comparison circuit 693, where comparison is made between the calculation Z value and the largest z value, and the comparison result is output to a write address generating circuit 694. The write address generating circuit 694 generates a write address when the comparison result input from the second comparison circuit 693 indicates that the calculation Z value is smaller.

The comparison result from the first comparison circuit 692 is also input to the write address generating circuit 694, which generates a write address while controlling the least significant 2 bits according to the comparison result of the comparison circuit 692.

After the above processing in the Z buffer control circuit 1035 in FIG. 6, the write address is output to the double buffer control circuit 1036. The Z value, the pixel value (R, C, B), and the degree of contribution input to the Z buffer control circuit 1035 are output to the double buffer control circuit 1036 as write data. The double buffer control circuit 1036 controls writing to each buffer so that the input write data is written to the input write address, thereby rewriting the content of each buffer when the Z value of the polygon is smaller.

Figure 7:
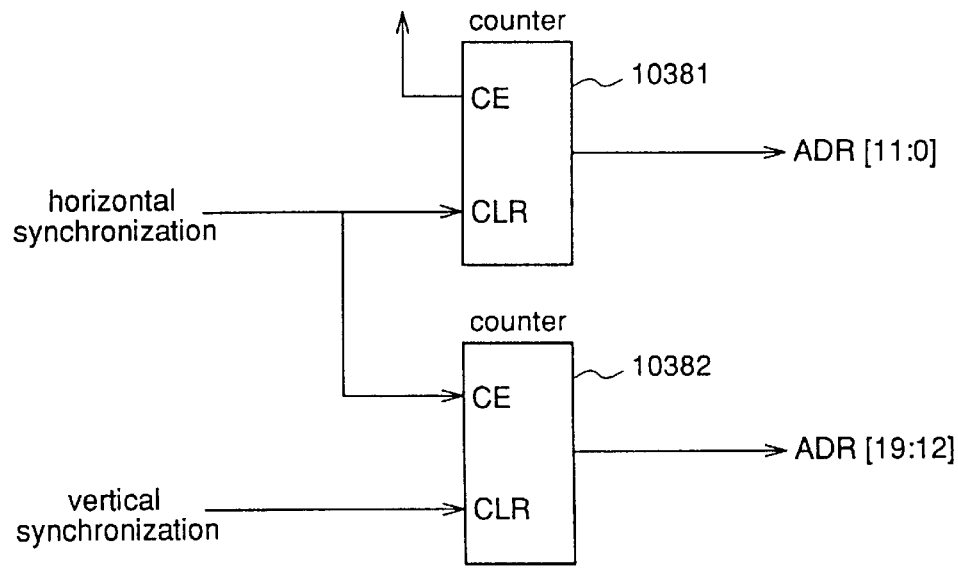
FIG. 7 is a block diagram showing an internal structure of a frame address generating circuit in the image generating unit of the image composition apparatus of the first embodiment.

The frame address generating circuit 1038 serially generates addresses of the Z buffer, the frame buffer, and the contribution-degree buffer, in synchronization with the timing control signal (see FIG. 1) input thereto through the depth composition circuit 104a from the synchronous signal generator 108. FIG. 7 shows a structure of the frame address generating circuit 1038 which implements an generation process. The frame address generating circuit 1038 comprises a first counter 10381 and a second z counter 10382. The first counter 10381 counts bits 11-0 of an address, whose content is cleared by a horizontal synchronizing signal, and generates an address by the use of a counter which is always counted up. A frequency at which the bits 11-0 are counted up is four times as long as a reciprocal (dot clock cycle) of display time of one pixel. Therefore the first counter 1038 is counted up 4 times during the display time of one pixel.

The second counter 10382 counts bits 19-12 of an address, whose content is cleared by a vertical synchronizing signal, and generates an address by the use of a counter which is counted up by the horizontal synchronizing signal. The counting thus performed by the first and second counters results in sequential access to 4 sets of values of the target pixel in synchronization with the synchronizing signal. The 4 sets of values of one pixel are sequentially output from the Z buffer, the frame buffer, and the contribution degree buffer.

The double buffer control circuit 1036 performs control so that one of the first and second buffer groups 1037a and 1037b is controlled by the Z buffer control circuit 1035 and the other is controlled by the frame address generating circuit 1038. This changes for each vertical synchronizing signal. In other words, switching between these buffers is performed frame by frame.

Turning to FIG. 1 again, a description will be given of the operation of the image generation apparatus again. The image generating units 103a, 103b, and 103c connected to the depth composition circuit 104a, 104b, and 104c, respectively, thus generate the Z values, the pixel values (R, B, G), and the degrees of contribution, and output to the corresponding depth composition circuits 103a, 103b, and 103c.

Respective depth composition circuits are connected as mentioned previously. The 4 sets of values to be transferred between the circuits are rearranged in ascending order of Z values. Here it is assumed that the 4 sets of values so rearranged are called "level 0", "level 1", "level 2" and "level 3", respectively. Hereinafter, a description will be given of detailed structures and operation of the depth composition circuits 104a, 104b, and 104c.

Figure 8:
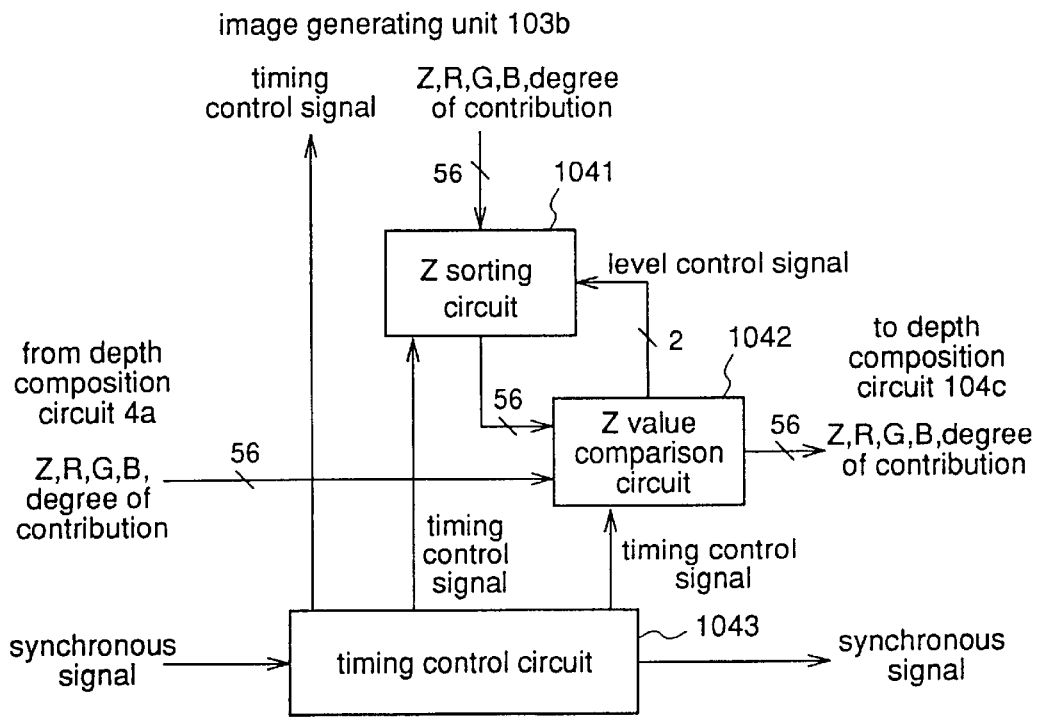
FIG. 8 is a block diagram showing an internal structure of a depth composition circuit of the image composition apparatus of the first embodiment.

Turning now to FIG. 8, the depth composition circuit 104b is shown. The circuit 104b comprises a Z sorting circuit 1041, a Z comparison circuit 1042, and a timing control circuit 1043.

The Z values, the pixel values (R, G, B), and the degrees of contribution are input from the image generating unit 103b to the Z sorting circuit 1041 in the depth composition circuit 104b. The Z sorting circuit 1041 sorts (rearranges) the 4 sets of Z values, pixel values, and degrees of contribution in ascending order of the Z values, and outputs a value according to a level control signal generated by the Z value comparison circuit 1042. For instance, when "0" is input as the level control signal, values of a set which has the smallest Z value are output irrespective of the order in which the 4 sets of values are input.

The Z value comparison circuit 1042 makes comparison among the 4 Z values input from the depth composition circuit 104a, and the 4 Z values in the Z sorting circuit 1041, to select 4 sets which have smaller Z values, and outputs the selected 4 sets to the depth composition circuit 104c. This selection is performed by outputting the level control signal to the Z sorting circuit 1041 and obtaining the corresponding sets of values.

Figure 9:
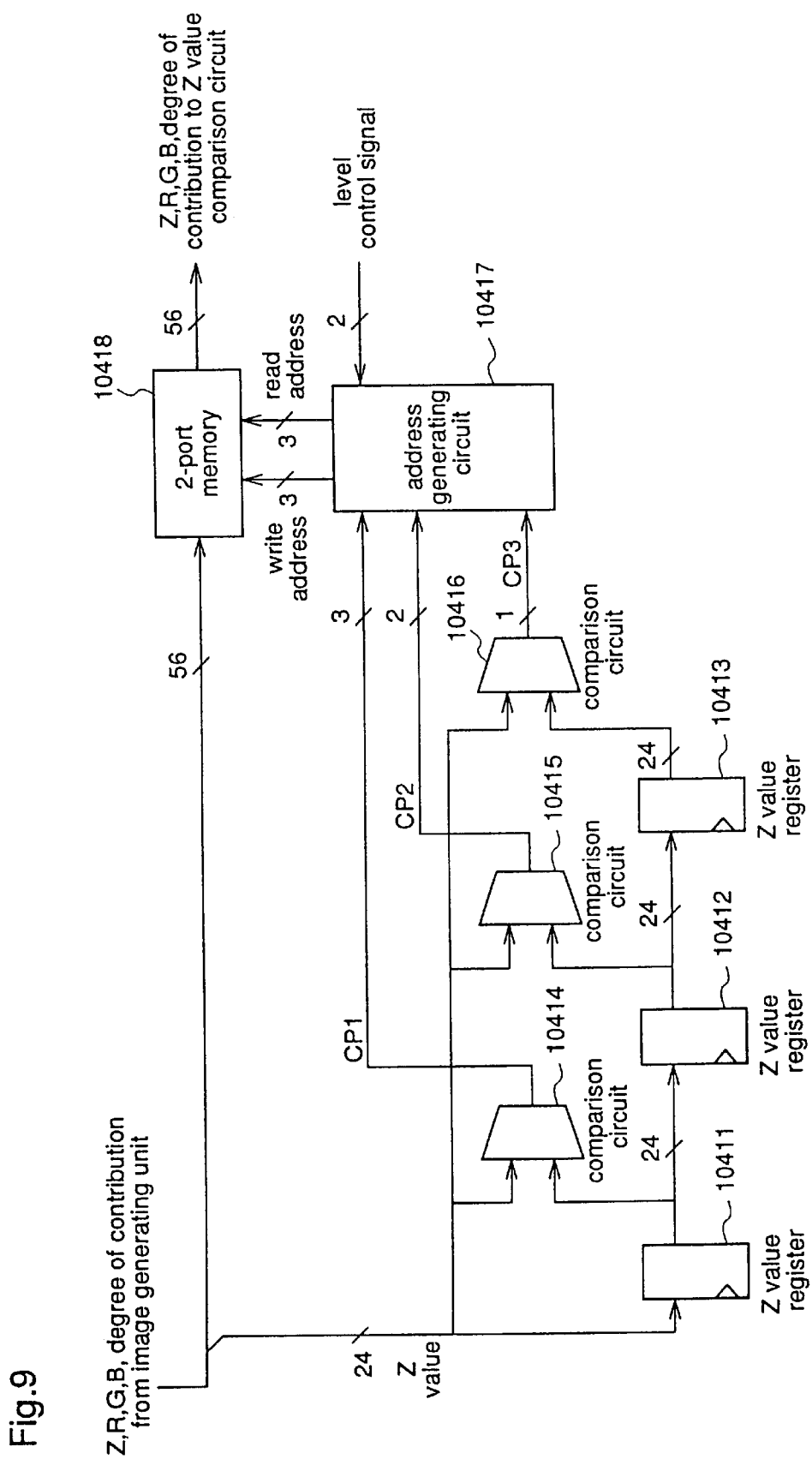
FIG. 9 is a block diagram showing an internal structure of a Z sorting circuit in the depth composition circuit of the image composition apparatus of the first embodiment.

The timing control circuit 1043 generates a timing control signal in synchronization with the synchronous signal (see FIG. 1) input from the synchronous signal generator 108 and outputs the control signal to the Z sorting circuit 1041 and the Z value comparison circuit 1042. The timing control circuit 1043 also outputs the timing control signal to the image generating unit 103b (see FIGS. 1 and FIG. 9 shows an internal structure of the Z sorting circuit 1041 with which the depth composition circuit 104b is provided. Turning to FIG. 9, the Z sorting circuit 1041 comprises a first Z value register 10411, a second Z value register 10412, a third Z value register 10413, a first comparison circuit 10414, a second comparison circuit 10415, a third comparison circuit 10416, an address generating circuit 10417, and a 2-port memory 10418.

The first to third Z value registers 10411–10413 each holds an input Z value. The first to third comparison circuits 10414–10416 each compares the Z value held in the corresponding Z value register to the Z value input thereto from the image generating unit 103b. The address generating circuit 10417 generates a read address and a write address of the 2-port memory 10418, according to the comparison results by the First to third comparison circuits 10414–10416.

The Z value, the pixel value, and the degree of contribution are input to the Z sorting circuit 1041 so structured, and these values are stored in the memory 10418 of (56 bits×8 words). At this time, the write address input from the address generating circuit 10417 is incremented one by one, and the 4 sets of values of a pixel are stored in respective addresses in the order which they are input.

The input Z value is also stored in the Z value register 10411 in the Z sorting circuit 1041. The first to third Z value registers 10411, 10412, and 10413 constitute a shift register. Every time the Z value is input, that is, in each cycle, the stored value is shifted from the first to the second register, and the second to the third register.

The Z value held in the first register 10411 (first Z value) is input to the first comparison circuit 10414. The first comparison circuit 10414 receives the Z value input in the corresponding cycle as an input, and compares this Z value to the first Z value. The first comparison circuit 10414 holds a comparison result, and outputs the comparison result of the corresponding cycle, a comparison result of a one-cycle previous cycle, and a comparison result of a two-cycle previous cycle, as a signal CP1 to the address generating circuit 10417.

The second comparison circuit 10415 outputs a comparison result of the input Z value of the corresponding cycle and a value (second held Z value) held in the second Z value register 10412, and the comparison result of the one-cycle previous cycle to the address generating circuit 10417 as a signal CP2. The third comparison circuit 10416 outputs a comparison result of the input Z value of the corresponding cycle and the value held in the third Z value register 10413 to the address generating circuit 10417 as a signal C23.

When the 4 sets of values have been input to the address generating circuit 10417, it arranges these values in ascending order of the Z values according to the signals CPI-CP3 output from the first to third comparison circuits, respectively. The address generating circuit 10417 receives the level control signal from the Z value comparison circuit 1042 (FIG. 8) as an input, and generates a read address according to the level control signal. The 2-port memory 10418 is 8-word organized. 4 words are first input to the memory 10418, and another 4 words for a subsequent pixel are input thereto while arranging the first 4 words in the order of the levels of the Z values. In other words, the 2-port memory 10418 is a double-buffered memory.

Figure 10:
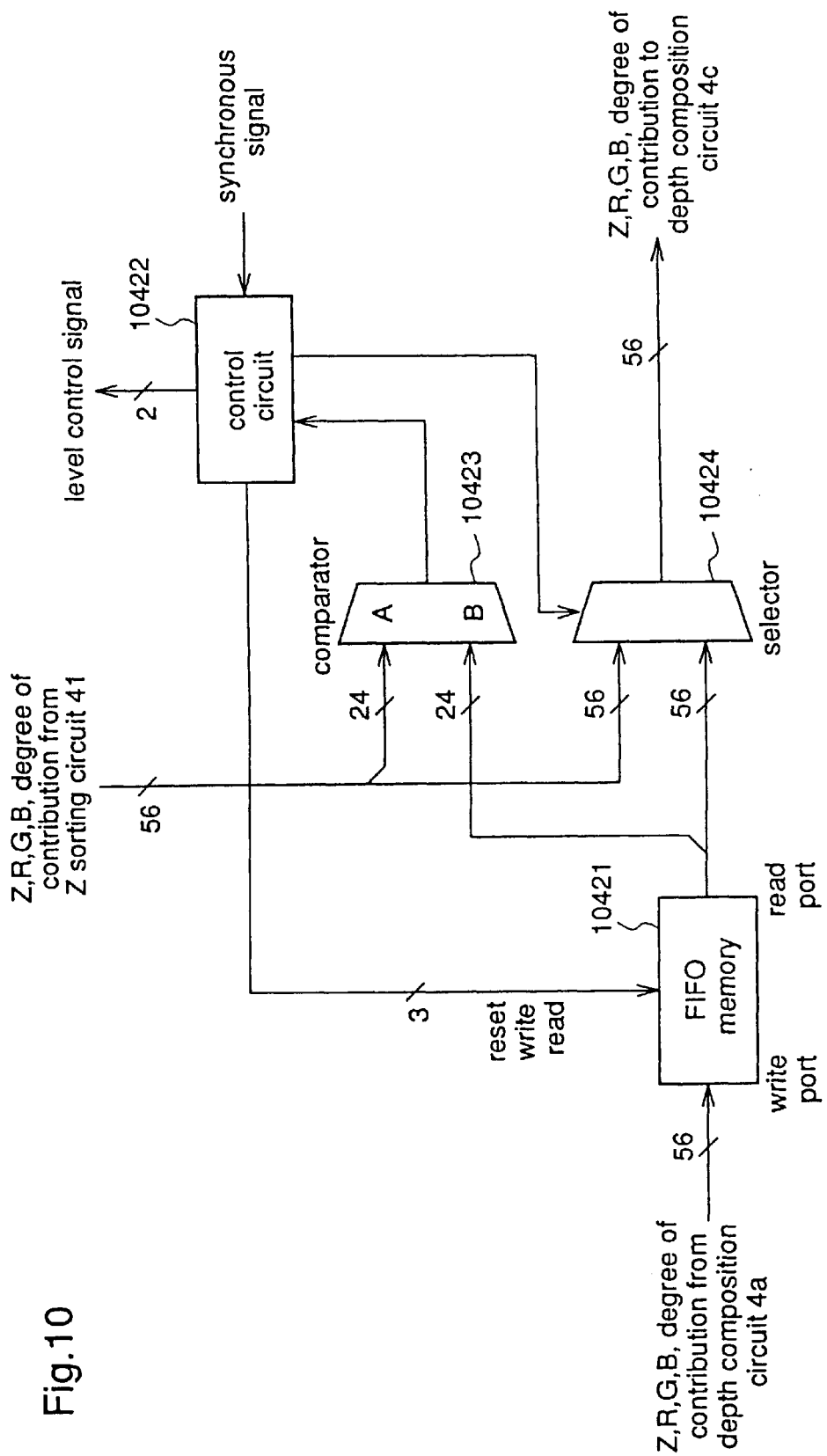
FIG. 10 is a block diagram showing an internal structure of a Z value comparison circuit in the depth composition circuit of the image composition apparatus of the first embodiment.

As a result, the Z values, the pixel values (R, G, B) and the degrees of contribution output from the Z sorting circuit 1041 to the Z value comparison circuit 1042 have levels according to the level control signal output from the Z value comparison circuit 1042 FIG. 10 shows an internal structure of the Z value comparison circuit 1042. Turning to FIG. 10, the Z value comparison circuit 1042 comprises an FIFO (First In First Out) memory 10421, a control circuit 10422, a comparator 10423, and a selector 10424.

The FIFO memory 10421 holds the Z values, the pixel values, and the degrees of contribution input from the depth composition circuit 104a as shown in FIG. 8. The FIFO memory 10421 is capable of data's being read in the order which the data has been written thereto (Data is processed on a first-in, first-out basis) A write port of the memory 10421 is connected to the depth composition circuit 104a and a read port thereof is connected to the comaparator 10423 and the selector 10424. The FIFO memory 10421 has a capacity (2-word length) for holding 2 sets of Z values, pixel values, and degrees of contribution.

The control circuit 10422 generates the level control signal according to the input synchronous signal, and controls the whole Z value comparison circuit 1042. The comparator 10423 compares the Z value held in the FIFO memory 10421 to the value input from the Z sorting circuit 1041. The selector 10424 selects one of these two values under the control of the control circuit 10422.

The depth composition circuit 104a outputs Z values, pixel values, and degrees of contribution of levels "0", "1", "2", and "3" in the corresponding cycles, respectively. The control circuit 10422 outputs a signal in accordance with which the FIFO memory 10421 is reset before these values of level "0" are input thereto, and thereby the FIFOmemory 10421 is reset. In a cycle, values of level "0" are input and written to the FIFO memory 10421, and in a subsequent cycle, they are output therefrom.

The FIFO memory 10421 outputs the Z value to the comparator 10423 (comparator input B). The Z sorting circuit 1041 also outputs the Z value to the comparator 10423 (comparator input A). The comparator 10423 makes comparison between the Z value (A) and the Z value (B), and outputs the comparison result to the control circuit 10422.

The control circuit 10422 generates a signal for controlling selection of the selector 10424 (selection control signal) according to the comparison result from the comparator 10423 and outputs the selection control signal to the selector 10424. The selection control signal indicates that the output of the Z sorting circuit should be selected when the comparison result input to the control circuit 10422 is "A≦B", and indicates that the output of the FIFO memory 10421 should be selected when the result is "A>B".

The level control signal generated by the control circuit 10422 is counted up in a subsequent cycle when the comparison result is "A≦B".

The control circuit 10422 outputs a read control signal to the FIFO memory 10421. The signal is "1" in the corresponding cycle when the comparison result is "A>B". Then, a subsequent value is read from the FIFO memory 10421 in a subsequent cycle. A write control signal to the FIFO memory 10421 is "1" in the corresponding cycle when there is an input from the depth composition circuit 104a, and data is written thereto. Data is not written to the FIFO memory 10421 if there is 3 or more data therein which has not been read therefrom. This is because the FIFO memory 10421 has a capacity of 2 sets of data. It should be remembered that it is not necessary to hold 3 sets or more of data in the FIFO memory 10421 since data of 4 levels input from the depth composition circuit 104a has been rearranged in ascending order of Z values. When 2 sets has been held in the memory 10421, it is decided that the third set of data is not necessary irrespective of values. In this case, it is therefore not necessary to perform writing operation.

FIG. 11 and shows examples of operation of the Z value comparison circuit 1042. In this figure, comparison results of the comparator 10423 are different.

The selector 10424 in FIG. 10 outputs the Z values, the pixel values, and the degrees of contribution, which becomes the output of the Z value comparison circuit 1042 in FIG. 8, and becomes the output of the depth composition circuit 104b in FIG. 1, which is output to the depth composition circuit 104c.

The internal structure and operation of the depth composition circuit 104b are as described above. On the other hand, the depth composition circuit 104a is connected to the image generating unit 103a, and a circuit at a previous stage thereof is not present. For this reason, the largest Z value which can be represented is input to an input port of the circuit 104a from the previous stage. The depth composition circuit 104a is connected to the depth composition circuit 104b at its subsequent stage. The depth composition circuit 104c is connected to image generating unit 103c and to the depth composition circuit 104b. The circuit 104c is connected to the mixing ratio calculating circuit 105 and the pixel mixing circuit 106 at a subsequent stage thereof. Internal structures and operation of the depth composition circuits 104a and 104c are identical to those of the depth composition circuit 104b in FIG. 8, except the connection relationship.

Turning to FIG. 1 again, the description of operation of the image generation apparatus will be continued. The depth composition circuit 104c outputs the selected Z values and degrees of contribution to the mixing ratio calculating circuit 105. The selected pixel values (R, G, B) are output to the pixel mixing circuit 106. The synchronous signal passing through the depth composition circuits 104a–104c is output to the mixing ratio calculating circuit 105 and the pixel mixing circuit 106.

The mixing ratio calculating circuit 105 calculates mixing ratios of 4 sets of pixel values (R, G, B) and outputs the ratios to the pixel mixing circuit 106. Hereinafter, a description will be given of a detailed structure and operation of the mixing ratio calculating circuit 105.

Figure 12:
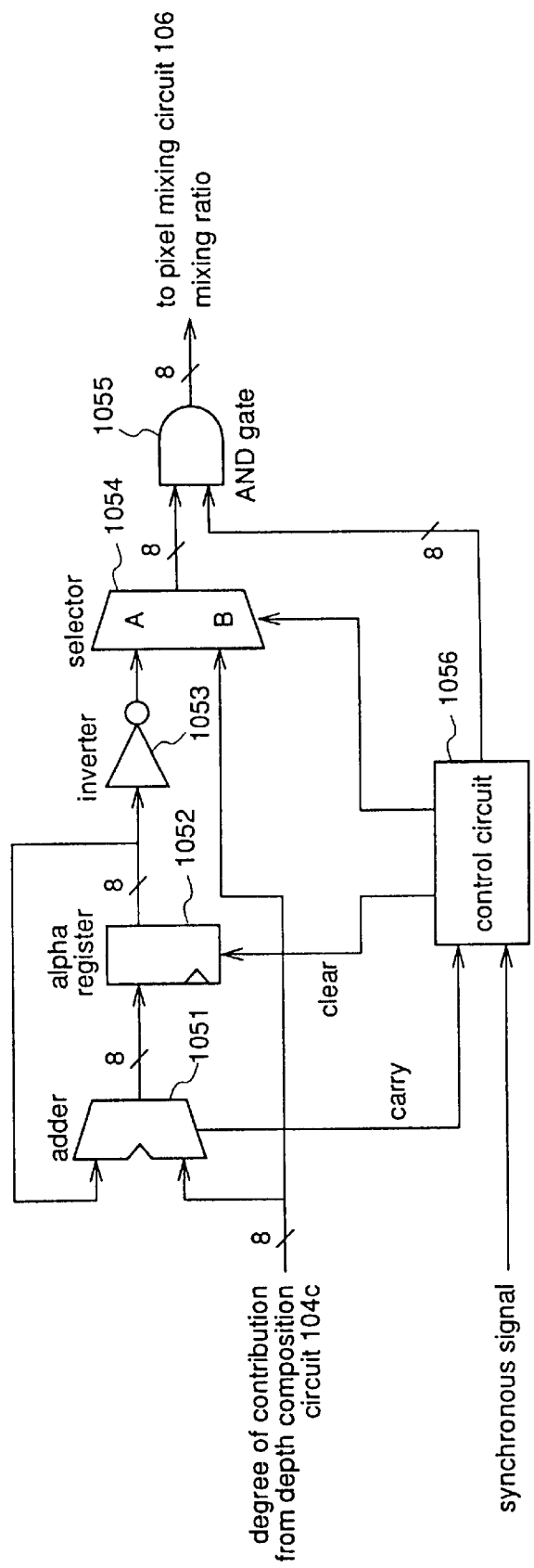
FIG. 12 is a block diagram showing an internal structure of a mixing ratio calculating circuit of the image composition apparatus of the first embodiment.

FIG. 12 shows an internal structure of the mixing ratio calculating circuit 105. The mixing ratio calculating circuit 105 comprises an adder 1051, an alpha register 1052, an inverter 1053, a selector 1054, an AND gate 1055, and a control circuit 1056.

The adder 1051 performs addition process to obtain an added value of degrees of contribution of input levels. The alpha register 1052, the inverter 1053, the selector 1054, and the AND gate 1055 find a mixing ratio to be output to the pixel mixing circuit 106 according to the result obtained by the adder 1051. The control circuit 1056 controls the whole mixing ratio calculating circuit 10S.

Turning to FIG. 1 again, the depth composition circuit 104c outputs degrees of contribution of levels "0", "1", "2", and "3" in the corresponding cycles, respectively. The control circuit 1056 in FIG. 12 generates and outputs a signal in accordance with which the alpha register 1052 is reset before the degree of contribution of the level "0" is input, and thereby the value held in the alpha register 1052 is cleared. When the values of respective levels have been input, the values in the alpha register 1052 are integrated by the adder 1051, and the resulting value is temporarily held in the alpha register 1052 as an alpha value.

The adder 1051 outputs a "carry" to the control circuit 1056 when the sum of the degrees of contribution becomes 100% (255, 8 -bit). The control circuit 1056 controls the selector 1054 and the AND gate 1055 so that the degrees input from the depth composition. crzuit 104c are directly output to the pixel mixing circuit 106 as mixing ratios until the circuit 1056 has detectedthe carry from the adder 1051. The selector 1054 selects "B" controlled by the control circuit 1056. The signal output from the control circuit 1056 to the AND gate 1055 is made up of bits "1".

When the control circuit 1056 has detected the carry from the adder 1051, it performs control so that one's complement of the alpha value is output in the corresponding cycle. Under this control, the selector 1054 selects "A", and thereby an alpha value inverted by the inverter 1053 is selected. Therefore, the one's complement is output. The signal output from the control circuit 1056 to the AND gate 1055 is made up of bits "1". The control circuit 1056 performs control so that "0" is always output in a cycle subsequent to the cycle in which the carry has been detected. In other words, the control circuit 1056 outputs bits "0" to the AND gate 1055.

As a result of the above control, when the sum of the degrees of contribution becomes 100% (255, 8 bit), a circuit which ignores degrees of contribution of the following levels is realized. Under the control, even if any combination of values is input as degrees of contribution, the sum of the mixing ratios does not exceed 1009. Such control can prevent the pixel values (R, G, B) mixed by the pixel mixing circuit 106 from overflowing.

Turning to FIG. 1 again, the mixing ratio calculating circuit 105 outputs the mixing ratio to the pixel mixing circuit 106. The depth composition circuit 104c outputs the pixel values to the pixel mixing circuit 106. The pixel mixing circuit 106 mixes the input pixel values (R,G,B) according to the mixing ratios from the mixing ratio calculating circuit 105, to generate pixel values (R, G, B) of pixels to be displayed.

Figure 13:
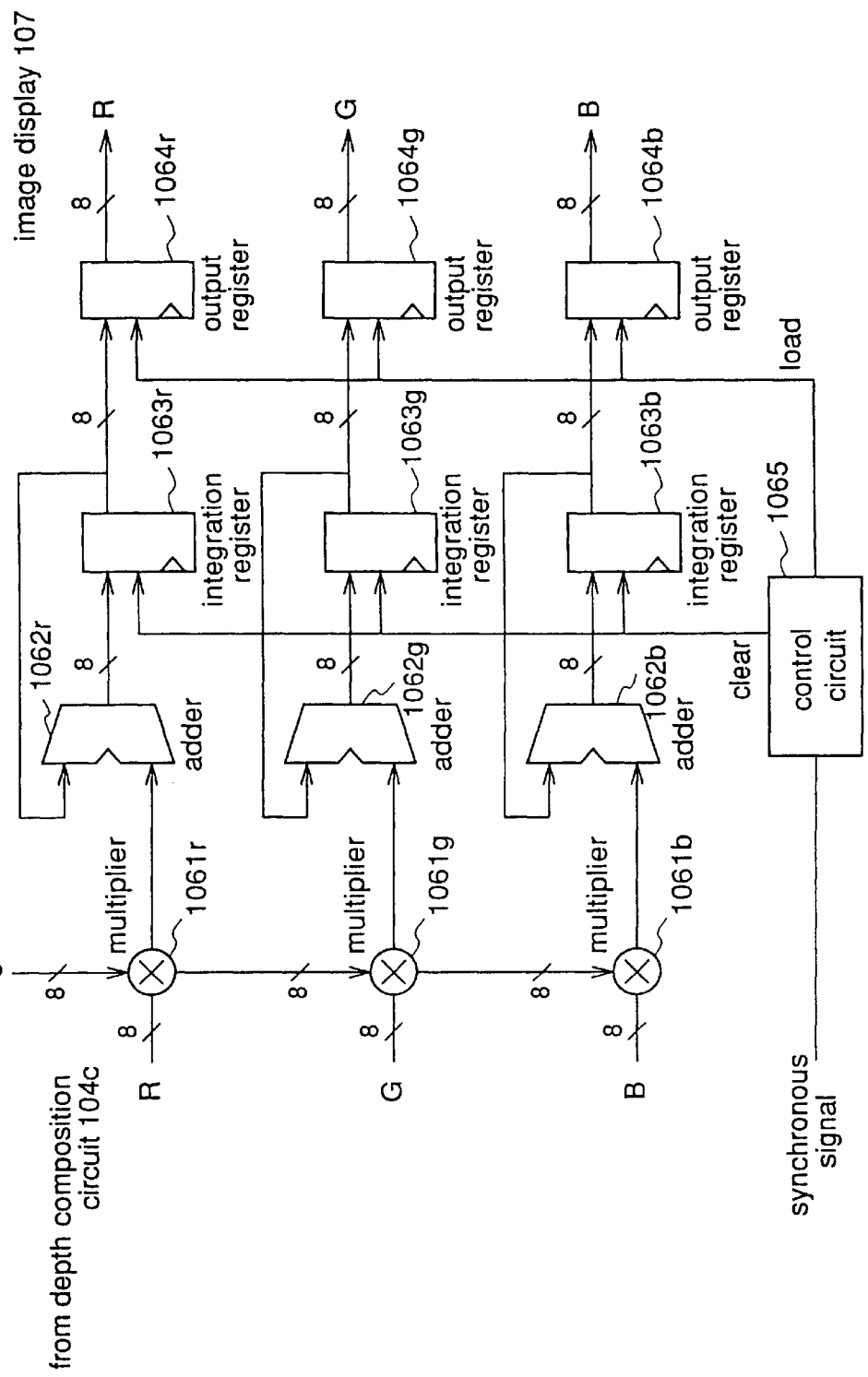
FIG. 13 is a block diagram showing an internal structure of a pixel mixing circuit of the image composition apparatus of the first embodiment.

A description will be given of a detailed structure and operation of the pixel mixing circuit 106. FIG. 13 shows an internal structure of the pixel mixing circuit 106. The pixel mixing ratio 106 comprises first to third multipliers 1061r, 1061g, and 1061b, first to third adders 1062r, 1062g, and 1062b, first to third integration registers 1063r, 1063g, and 1063h, first to third output registers 1064r, 1064g, and 1064b, and a control circuit 1065.

The first to third multipliers 1061r, 1061g, and 1061b multiply the mixing ratio by the input value (R, G, B). The first to third adders 1062r, 1062g, and 1062b integrate the pixel values (R, G, B)of all levels. The first to third integration registers 1063r, 1063g, and 1063b hold integration results. The first to third output registers 1064r, 1064g, and 1064b output the results held in the corresponding registers 1063r, 1063g, and 1063b, respectively. The control circuit 1065 controls the pixel mixing circuit 106.

The pixel mixing circuit 106 receives pixel values (R, G, B) Of levels "0", "1", "2", and "3" as inputs from the depth composition circuit 104c in the corresponding cycles, respectively. The control circuit 1065 in FIG. 13 generates and outputs a control signal in accordance with which the first to third integration register: 1063r, 1063g, and 1063b are reset, and thereby the values held in respective registers are cleared. When a value of each level is input, values held in the first to third registers 1063r, 1063g, 1063b are respectively added to the value respi-ting from multiplying the input pixel value (R, G, B) by the mixing ratio. When the pixel value of the level "3" is input, and at the completion of the processing, values resulting from mixing pixel values (R, G, B) of all the levels according to the mixing ratios are held in the registers 1063r, 1063g, and 1063b.

The control circuit 1065 outputs a load signal to the first to third output registers 1064r, 1064g, and 1064b so that values therein are updated in a cycle subsequent to the cycle in which the pixel value of the level "3" has been input. The pixel values (R, G, B) output to the image display 7 are values of respective levels which have been mixed according to the mixing ratios. The pixel values (R, G, B) output to the image display 107 in FIG. 1 are updated in the pixel mixing circuit 106 once in four cycles, which corresponds to display time during which one pixel is displayed on the display 107.

Thus, in accordance with the first embodiment, the image generation apparatus comprises the shape data dividing means 101, the shape data buffers 102a–102c, the image generating units 103a–103c, the depth composition circuit 104a–104c, the mixing ratio calculating circuit 105, the pixel mixing circuit 106, the image display 107, and the synchronous signal generator 108, wherein only the opaque polygon is subjected to an anti aliasing process, the translucent polygon is not subjected to an anti aliasing process, the degree of contribution is calculated from the degree of transparency for the translucent polygon, and the degree of contribution is calculated from the area of the polygon in the pixel for the opaque polygon. Therefore, the anti aliasing process is performed and the translucent object is represented while suppressing an increase in a capacity of the buffer memory.

Figure 18:
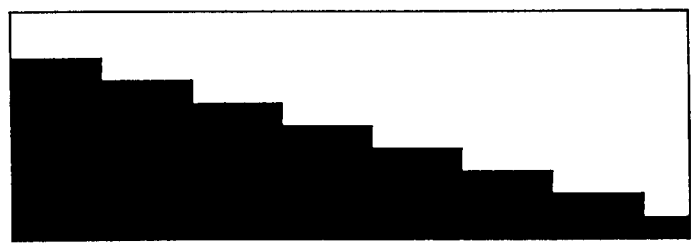
FIG. 18 is a diagram for explaining anti aliasing process.
Figure 18:
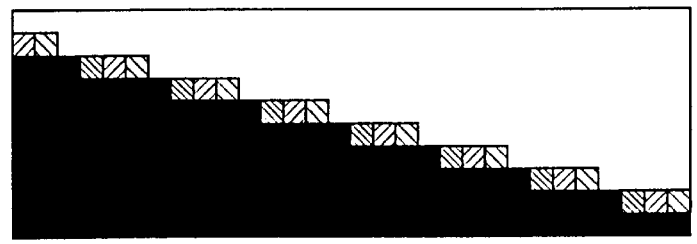
Figure 19:
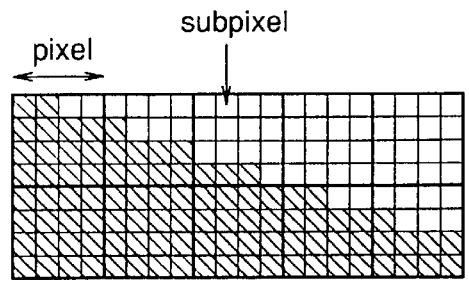
FIG. 19 is a diagram for explaining a process for dividing a pixel into sub-pixels in the anti aliasing process.
Figure 20:
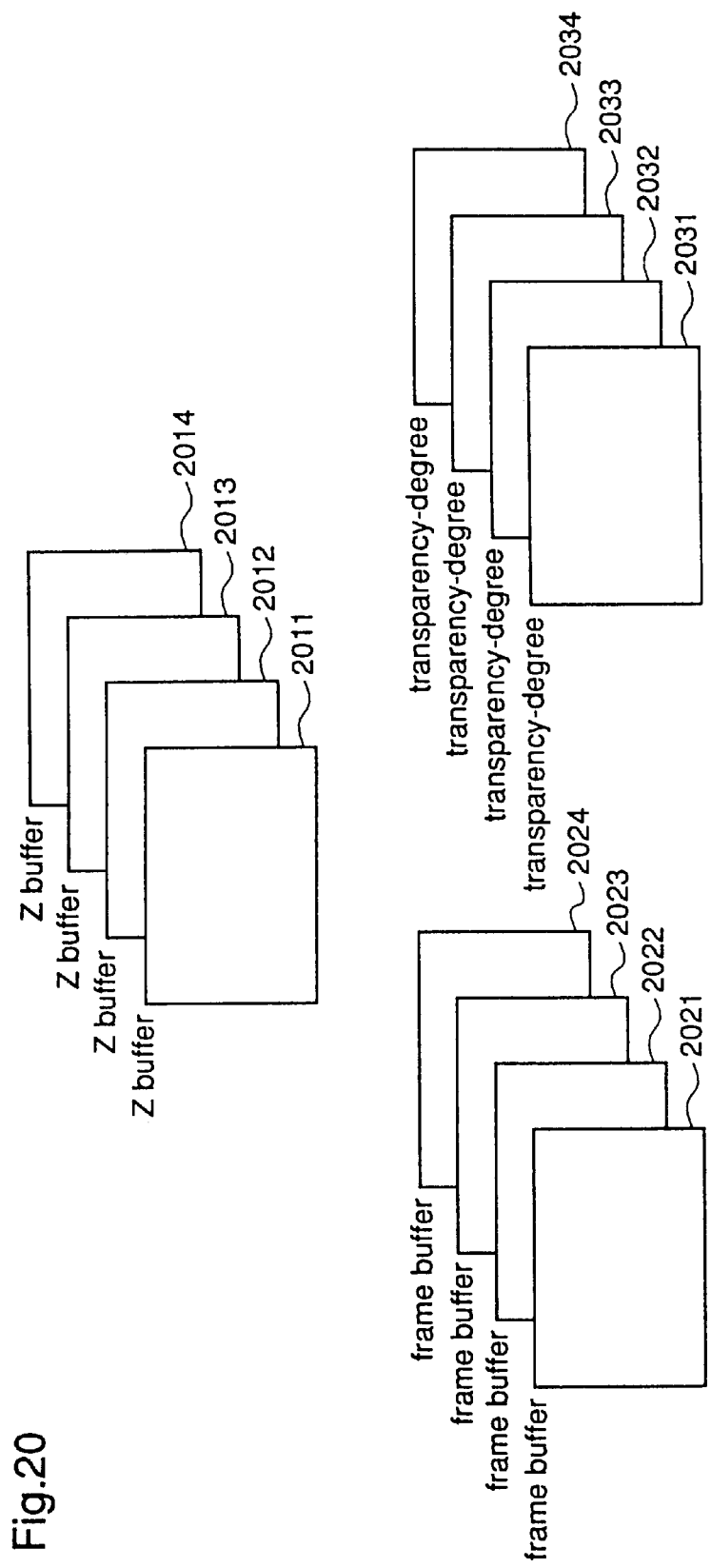
FIG. 20 is a diagram showing a process which uses plural buffers.
Figure 21:
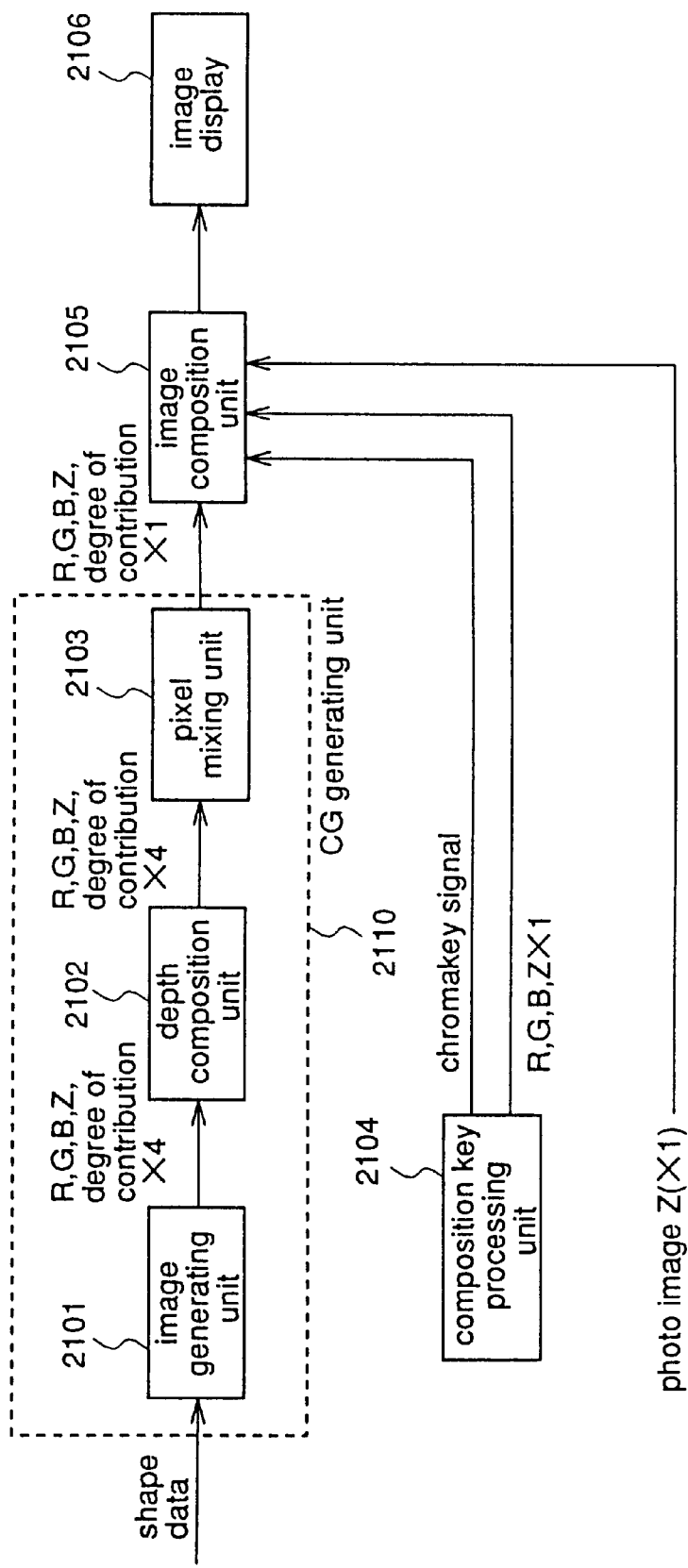
FIG. 21 is a block diagram showing an image composition apparatus according to a prior art.

To be more detailed, Z values, pixel values (R, G, B), and degrees of contribution are found for all the pixels in all the polygons. For the translucent polygon, the degree of contribution is calculated from the degree of transparency, while for the opaque polygon, the degree of contribution is calculated from the area of the polygon in the pixel. Thereby, the degree of contribution for the polygon which has a degree transparency is used in representing the translucent object, and the degree of contribution for the polygon which has no degree of transparency is used in anti aliasing process. Therefore, in contrast with the prior art in which one pixel is divided into 16 sub-pixels (16 memories per pixel), the capacity can be reduced to ¹⁄₁₆ because one pixel requires one memory to process the polygon which has no degree of transparency. In addition, if the translucent polygon is not subjected to the anti aliasing process, luminance does not changes significantly at a boundary of the translucent polygon. Therefore, unnaturalness shown in FIG. 18(*a*) does not appear. As a result, it is possible to realize the image generation apparatus which is capable of performing the anti aliasing process and representing the translucent object while suppressing an increase in capacities of the frame buffers and the Z buffers.

Moreover, the shape data dividing means 101 divides the shape data and the image generating units 103*a*–103*c*, and the depth composition circuits 104*a*–104*c* respectively process the divided shape data. Then, the mixing ratio calculating circuit 106 calculates the mixing ratio of the pixel value (R, G, B) in each frame buffer from the degree of contribution, and the pixel mixing circuit 107 mixes the pixel value (R, G, B) in each frame buffer to generate the pixel value (R, G, B) of the image to be output. Therefore, processing for finding the Z values, the pixel values (R, C, B), and the degrees of contribution for all the pixels is performed in parallel for each polygon. Thus, the depth composition circuits for compositing the pixel values and the degrees of contribution according to the Z values are provided, thereby compositing the results resulting from the concurrent processing. As a result, efficient and high-speed processing is realized.

[Embodiment 2]

An image generation apparatus of a second embodiment performs operation as in the case of the image generation apparatus of the first embodiment, and is adapted to process an interlaced image.

"Interlacing" is to divide time (one frame time) at which all the display pixels are scanned once into an even-numbered field (first-half) and an odd-numbered field (second half). In the even-numbered field, 510 scanning lines are scanned in the order of 0, 2, 4, ... , 2n (n: positive integer) of Y coordinates of screen coordinates, while in the odd-numbered field, 511 scanning lines are scanned in the order of 1, 3, 5, ... , 2n+1 (n positive integer) of Y coordinates.

In the interlacing, scanning lines are scanned from the top to the bottom in time which is half as long as one frame-time, and an advantage of thereof is therefore high response to high-speed motion. In general, however, an image quality is degraded, with half resolution in a Y direction. Therefore, this is suitable for the case where resolution in Y direction for a moving image which moves slowly or a still image is ensured. In the interlacing, when a spatial frequency is high in the Y direction of an image, "flicker" sometimes occurs even in the still image. Since the spatial frequency of a natural image displayed by TV broadcasting or the like, is low, the "flicker" does not matter. In a computer graphics image, the spatial frequency is high at a boundary between objects, and the "flicker" unique to the interlacing matters. It is necessary to perform a filtering process in the Y direction to suppress the flicker. In this second embodiment, when a degree of contribution is calculated, the filtering process is performed by the use of a pixel to be processed and a pixel adjacent thereto in the Y direction.

The image generation apparatus of the second embodiment is basically identical to that shown in FIG. 1, and internal structures of the image generating units 103*a*–103*c* in FIG. 1 are identical to those shown in FIG. 2. In brief, the operation of the image data calculating circuit 1034 in FIG. 2 is different from that of the first embodiment shown in FIG. 4.

Figure 14:
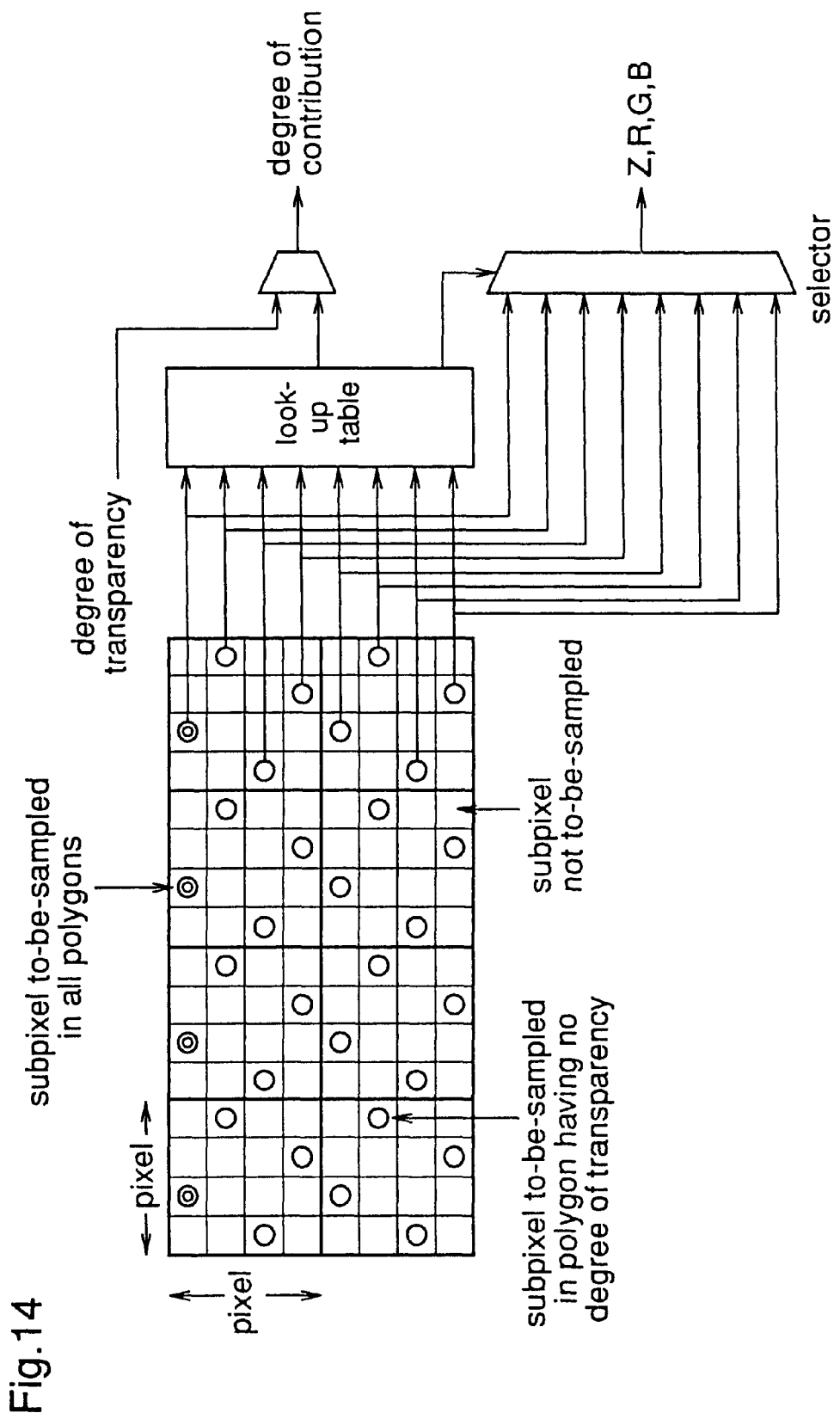
FIG. 14 is a diagram showing a process for generating degrees of contribution performed by an image data calculating circuit in an image generating unit of an image generation apparatus according to a second embodiment of the present invention.

FIG. 14 is a schematic view for explaining a processing performed by the image data calculating circuit 1034 (FIG. 2). Hereinafter, a description will be given of processing of the image data calculating circuit 1034 with reference to FIG. 14.

In this second embodiment, a pixel is divided into 16 sub-pixels and a pixel positioned immediately under the pixel (a pixel whose Y coordinate is larger than that of the former pixel by one) is divided into 16 sub-pixels, resulting in 32 sub-pixels in total, from which 8 pixels are sampled.

The sampled sub-pixels are converted into a degree of contribution with reference to a look-up table as in the case of the first embodiment. The look-up table shown herein has an 8-bit input, in which the look-up table shown in FIG. 5(*a*) has been extended. To be specific, in the look-up table, according to the number of bits "1" in binary notation, that is, when the number is "0", "1", "2", "3", "4", "5", "6", "7", or "8", the degrees are "0", "32", "64", "96", "128", "160", "192", "224", or "225". Also, an extension of the look-up table in FIG. 5(*b*) is referred to when selecting a Z value, and a pixel value (R, G, B) from values of the subpixels As a result of this processing, pixels on Y cnoordinates "0" and "1" are used to display a scanning line on a Y coordinate "0", and pixels on Y coordinates "1" ants "2" are used to display a scanning line on a Y coordinate "0". This suppresses the spatial frequency in the y direction and reduces the flicker unique to the interlacing display.

In accordance with the second embodiment, with the image data calculating circuit different from that of the first embodiment, sub-pixels are selected in prescribed positions by using 2 pixels adjacent to each other in the Y direction as a unit, and sub-pixels in one of two pixels are sampled for all the pixels. Therefore, the spatial frequency in the Y direction is suppressed to reduce the flicker unique to the interlacing display.

While in this second embodiment, the pixel is divided into 16 pixels (4×4 pixels), the pixel may divided into 36 sub-pixels (6×6 pixels). In this case, the number of sub-pixels to be sampled is "6" or "12" (interlacing) Also in this case, it should be remembered that sampling points are not aligned on a column and a row.

In addition, while in the first and second embodiments, the 4 sets of values to be transferred between the depth composition circuits have 4 levels (0–3) at which Z values have been rearranged in ascending order of them, the number of the levels is not restricted thereto In general, increasing the number of levels can perform hidden-surface process flexibly, thereby improving an image quality. On the other hand, this increases required memories, and causes cost-up. It is therefore desirable that the number of levels are set in view of desired image quality and cost.

Furthermore, the image generation apparatuses according to the first and second embodiments are described as dedicated apparatuses using dedicated circuits. However, it is possible to implement the image generation apparatuses according to the first and second embodiments by recording image generation programs for executing the processing of these embodiments in program recording media, and executing the programs by using a general-purpose computer system or the like. As the program recording media, those media described for the first and second embodiments are available.

The image generation apparatuses according to the first and second embodiments shown in FIGS. 1 and 2, respectively, are implemented are follows. The shape data dividing means, the image generating unit, the depth composition circuit, the mixing ratio calculating unit and the pixel mixing circuit, are implemented by executing the image generation program according to control of a CPU or a DSP; the synchronous signal generator is implemented by a clock generator and a clock synchronizer; the shape data buffers, the buffers in the image generating unit, and the 2-port memory in the depth composition circuit are implemented by main memories or auxiliary memories; and the image display unit is implemented by a monitor or a display. Further, the generated image may be stored in a memory or the like instead of displaying it on a monitor or the like and, in this case, the computer system can be used as an edition unit. Or, the generated image may be transmitted through a network system or the like for display or edition in a network computer or the like.

[Embodiment 3]

An image composition apparatus according to a third embodiment of the present invention handles photo image data equally to shape data used for CG generation, when compositing a photo image and a CG image.

Figure 15:
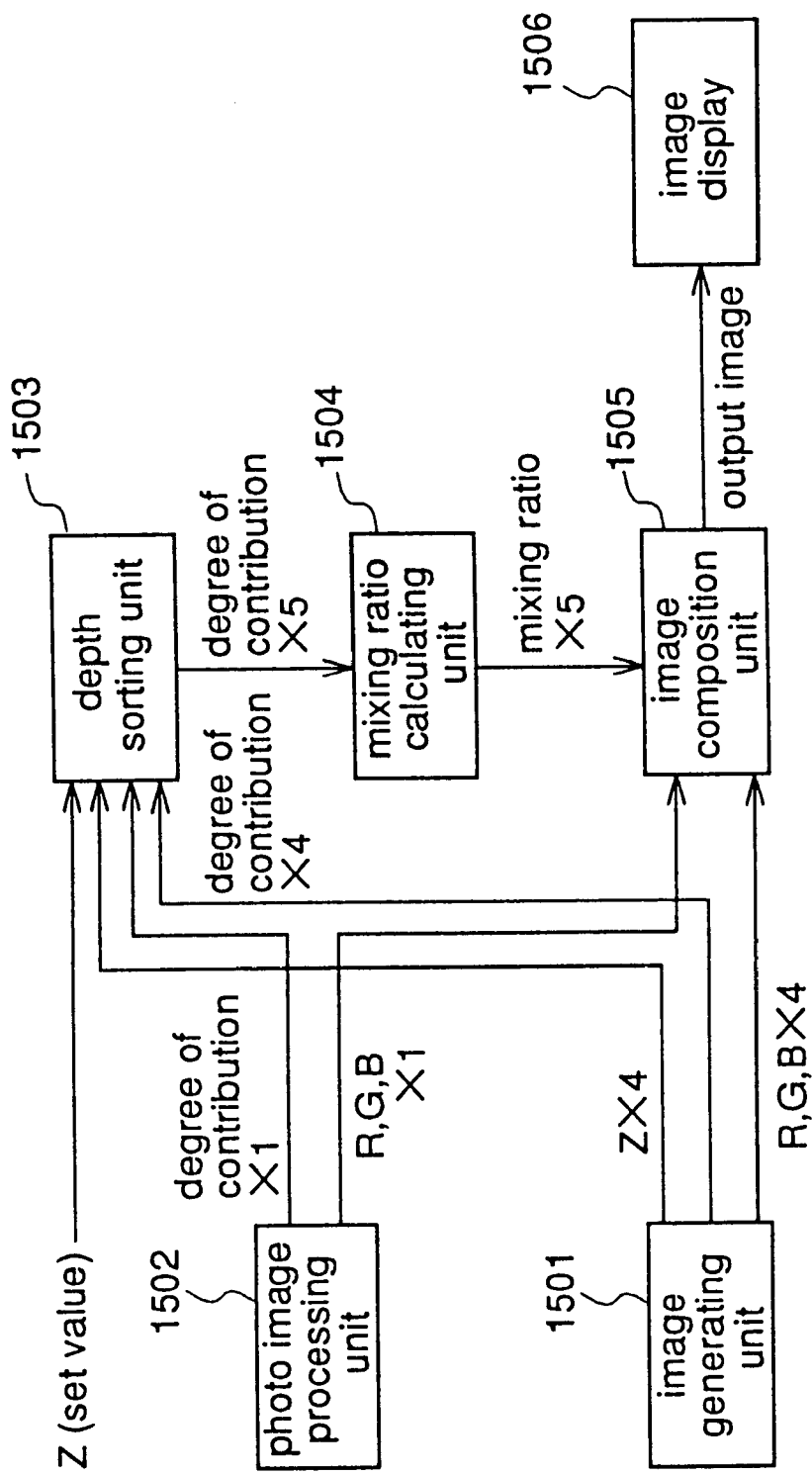
FIG. 15 is a block diagram showing an image composition apparatus according to a third embodiment of the present invention.

FIG. 15 is a block diagram illustrating the structure of the image composition apparatus according to the third embodiment. The image composition apparatus comprises an image generating unit 1501, a photo image processing unit 1502, a depth sorting unit 1503, a mixing ratio calculating unit 1504, an image composition unit 1505, and an image display unit 1506. Like the image generation apparatuses according to the first and second embodiments, the image composition apparatus treats an object to be displayed as a polygon, and uses shape data described as three-dimensional coordinates. The shape data includes information indicating the degree of transparency of each polygon In this third embodiment, the degree of transparency can be any value from 0 through 1. The polygon is opaque when the value is 1, and it is transparent when the value is 0. When the degree of transparency has a value between 0 and 1, the polygon is translucent according to the degree of transparency.

The image generating unit 1501 processes the input shape data successively, and generates a pixel value (R, G, B) and a depth value (Z) for each pixel with regard to the viewpoint. Further, as described later, the image generating unit 1501 generates the degree of contribution according to the anti aliasing process or the translucency process.

The photo image processing unit 1502 receives a photo image, and performs prescribed processing to generate a chromakey signal and photo image information comprising pixel values and Z values. The depth sorting unit 1503 sorts (rearranges) the Z values from the image generating unit 1501 and the Z values of the photo image, from the smallest Z value toward the largest Z value. The mixing ratio calculating unit 1504 performs addition to the input degree of contribution and generates a mixing ratio. The image composition unit 1505 performs calculation of the pixel values of the CG image and the photo image to generate pixel values of pixels to be displayed according to the mixing ratio generated by the mixing ratio calculating unit 1504. The image display unit 1506 displays the image using the pixel values generated by the image composition unit 1505.

A description is given of the operation of the image composition Apparatus so constructed, from inputting the shape data and the photo image to displaying the composite image.

Receiving the shape data, the image generating unit 1501 subjects polygon data (data of each polygon) of the shape data to geometric transformation to generate polygon data transformed into a screen coordinate system. According to the degree of transparency of the polygon data to be processed, the image generating unit 1501 decides whether the polygon is to be subjected to the anti-aliasing process or the translucency process. When the degree of transparency of the polygon to be processed (hereinafter referred to as "target polygon") is 1 (opaque), the image generating unit 1501 performs the anti-aliasing process. When it is less than 1, the unit 1501 performs the translucency process.

When performing the anti-aliasing process, the image generating unit 1501 divides one pixel on the screen into 4×4 sub-pixels, and checks whether each of the sub-pixels is positioned inside the target polygon or not, thereby generating a degree of contribution which is the ratio of the polygon to each pixel. As in the first embodiment shown in FIG. 4, the image generating unit 1501 may obtain the degree of contribution by sampling some of the 16 sub-pixels into which one pixel is divided. on the other hand, when the image generating unit 1501 performs the translucency process, the above-described division of one pixel into sub-pixels and extraction of carried out, and the degree of transparency of the target polygon is used as the degree of contribution. So, when the degree of transparency of a polygon is 0 (transparent), the degree of contribution of this polygon is also 0 and, therefore, this polygon is actually excluded from the objects to be displayed.

In either case, the target polygon is subjected to the subsequent processing as long as its degree of contribution is not 0. The image generating unit 1501 compares the Z value read from the Z buffer with the Z value of the target polygon and, when the Z value of the target polygon is smaller than the Z value from the Z buffer, the unit 1501 writes the Z value of the target polygon into the buffer. Further, the unit 1501 writes the pixel values (R,G,B) of the target polygon into the frame buffer, and writes the degree of contribution of the target polygon into the contribution-degree buffer. Accordingly, the image generating unit 1501 holds the data of four polygons from the polygon having the smallest Z value.

Meanwhile, the photo image processing unit 1502 receives the photo image and generates a chromakey signal and pixel values. Then, the unit 1502 outputs the chromakey signal as the degree of distribution of the photo image toward the depth sorting unit 1503. Further, the unit 1502 outputs the pixel values toward the image composition unit 1505.

The depth sorting unit 1503 receives the Z values of the polygon data from the image generating unit 1501, and receives a Z value which has previously been set as the depth value of the photo image. Then, the depth sorting unit 1503 sorts (rearranges) the tour Z values from the image generating unit 1501 and the set Z value, from the smallest (shallowest) Z value toward the largest (deepest) Z value. Further, the depth sorting unit 1503 receives the degrees of contribution of the four polygon data from the image generating unit 1501 and the degree of contribution of the photo image, and outputs these five degrees of contribution toward the mixing ratio calculating unit 1504 in the order of the above-described sorting of the Z values.

Therefore, five degrees of contribution, which have been sorted according to the order of the Z values, are input to the mixing ratio calculating unit 1504. In the mixing ratio calculating unit 1504, these degrees are successively added to generate mixing ratios. During the successive addition, as long as the sum does not exceed 1, the degree of contribution is taken as a mixing ratio. When the sum exceeds 1, the one's complement of the sum is taken as a mixing ratio and, thereafter, the mixing ratio is regarded as 0 without executing a calculation. Thereby, the mixing ratio is prevented from exceeding 1. The mixing ratio calculating unit 1504 outputs the five mixing ratios so generated toward the image composition unit 1505.

In the image composition unit 1505, the pixel values supplied from the image generating unit 1505 and the photo image processing unit 1502 are subjected to integration using the five mixing ratios supplied from the mixing ratio calculating means 1504. As the result, the image composition unit 1505 generates a composite image in which 4 levels of CG images and one level of photo image are composited. The composite image so generated is output from the image composition unit 1505 to the image display unit 1506, and displayed in the image display unit 1506.

As described above, according to the third embodiment of the invention, the image composition apparatus comprises the image generating unit 1501, the photo image processing unit 1502, the depth sorting unit 1503, the mixing ratio calculating unit 1504, the image composition unit 1505, and the image display unit 1506. The depth sorting unit 1503, the mixing ratio calculating unit 1504, and the image composition unit 1505 process four levels of CG image and one level of photo image. Therefore, a photo image and a CG image including a translucent object and an opaque object can be composited so that the photo image is inserted between these objects of the CG image, whereby a high-quality image can be obtained even when a photo image is inserted behind an object subjected to the anti-aliasing process. Further, the image composition apparatus according to this third embodiment is implemented by extending the prior art image composition apparatus, which processes four levels of signals when generating CG, so that it can process five levels of signals. Therefore, the above-mentioned effects can be obtained without significantly increasing the cost of the apparatus.

[Embodiment 4]

An image composition apparatus according to a fourth embodiment of the present invention creates an image in like manner as described for the image generation apparatus according to the first embodiment, and composites the created CG image with a photo image in a like manner as described for the image composition apparatus according to the third embodiment.

Figure 16:
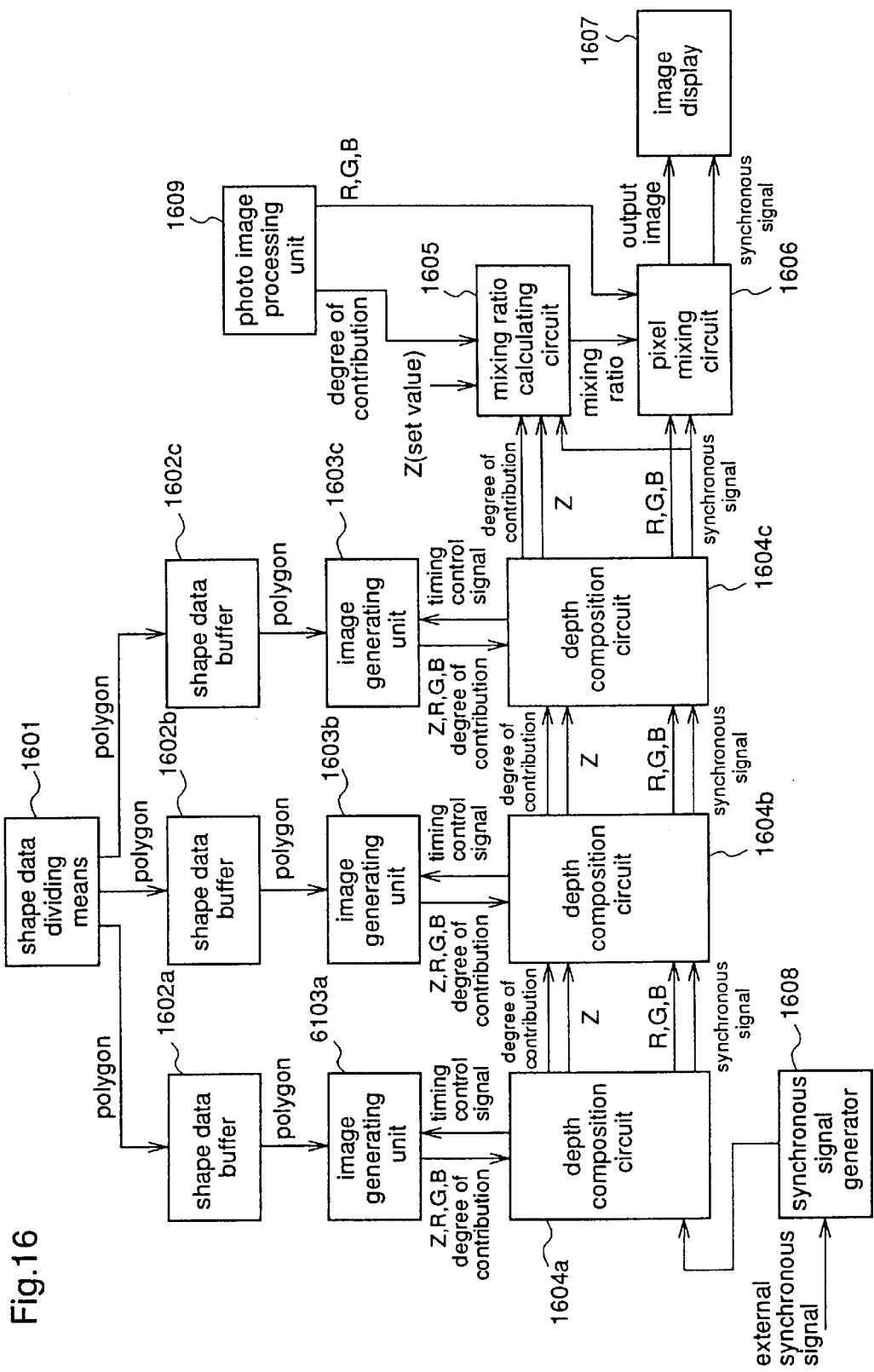
FIG. 16 is block diagram showing an image composition apparatus according to a fourth embodiment of the present invention.
Figure 17:
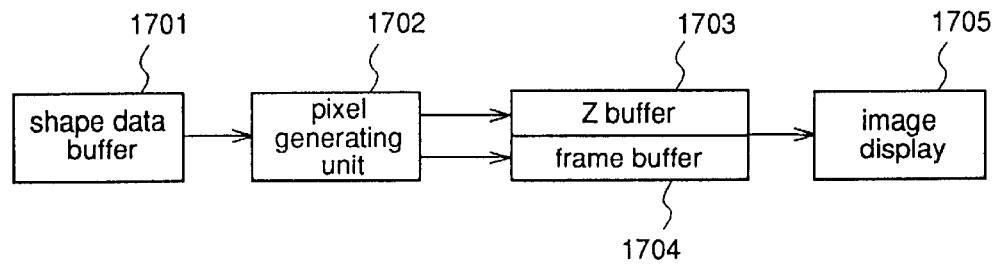
FIG. 17 is a block diagram showing an image generation apparatus according to a prior art.

FIG. 16 is a block diagram illustrating the structure of the image composition apparatus according to this fourth embodiment. The image composition apparatus comprises shape data dividing means 1601, shape data buffers 1602*a*~1602*c*, image generating units 1603*a*~1603*c*, depth composition units 1604*a*~1604*c*, a mixing ratio calculating circuit 1605, a—pixel mixing circuit 1606, an image display unit 1607, a synchronous signal generator 1608, and a photo image processing unit 1609.

The shape data dividing means 1601, the shape data buffers 1602*a*~1602*c*, the image generating units 1603*a*~1603*c*, the depth composition circuits 1604*a*~1604*c*, the image display unit 1607, and the synchronous signal generator 1608 are identical to those of the first embodiment (101, 102*a*~102*c*, 103*a*~103*c*, 104*a*~104*c*, 107, and 108), and the photo image processing unit 1609 is identical to that of the third embodiment (1502). The photo image processing unit 1609 of this fourth embodiment outputs the generated chromakey signal as a degree of contribution of the photo image to the mixing ratio calculating circuit 1605, and outputs the generated pixel values of the photo image to the pixel mixing circuit 1606.

The mixing ratio calculating circuit 1605 generates mixing ratios in a like manner as described for the mixing ratio calculating circuit 105 of the first embodiment. However, the mixing ratio calculating circuit 1605 of this fourth embodiment is different from the circuit 105 of the first embodiment in that it receives not only the degrees of contribution and depth values of four levels of CG but also the degree of contribution for one level from the photo image processing unit and the Z value set as the depth value of the photo image, and uses these values for calculation.

The pixel mixing circuit 1606 generates an image to be output based on the mixing ratios generated by the mixing ratio calculating circuit 1605, in a like manner as described for the pixel mixing circuit 106 of the first embodiment. When generating the image, the pixel mixing circuit 1606 performs mixing by using the pixel values for one level of the photo image supplied from the photo image processing unit 1609 as well as the pixel values for four levels of CG supplied from the depth composition circuit 1604*c*, to generate pixel values of the image to be output.

The operation of the image composition apparatus according to this fourth embodiment is identical to the operation of the image generation apparatus according to the first embodiment except for the operations of the photo image processing unit 1609, the mixing ratio calculating circuit 1605, and the pixel mixing circuit 1606.

As described above, the image composition apparatus according to this fourth embodiment comprises the shape data dividing means 1601, the shape data buffers 1602*a*~1602*c*, the image generating units 1603*a*~1603*c*, the depth composition circuits 1604*a*~1604*c*, the mixing ratio calculating circuit 1605, the pixel mixing circuit 1606, the image display unit 1607, the synchronous signal generator 1608, and the photo image processing unit 1609. Therefore, this apparatus performs CG image generation including the anti-aliasing process and the translucency process like the image generation apparatus of the first embodiment, and performs image composition of four levels of CG images and one level of photo image. So, the image composition apparatus can generate a high-quality CG image while suppressing the quantity of memories required as buffers, and the quality of the composite image of the CG image and the photo image can be improved by only extending the image generation apparatus of the first embodiment.

While in this fourth embodiment the photo image processing unit 1609 is added to the image generation apparatus of the first embodiment, it may be added to the image generation apparatus of the second embodiment and, in this case, the resultant apparatus is adapted to interlacing.

Further, while in the third and fourth embodiments the level number in the CG generation is four as in the first and second embodiments, the level number is not restricted thereto, and the image quality can be improved by increasing the level number within the limits of the cost allowed.

Furthermore, the image composition apparatuses according to the third and fourth embodiments are described as dedicated apparatuses using dedicated circuits like the image generation apparatuses according to the first and second embodiments. However, it is possible to implement the image composition apparatuses according to the third and fourth embodiments by recording image composition programs for executing the processing of these embodiments in program recording media, and executing the programs by using a versatile computer system or the like. As the program recording media, those media described for the first and second embodiments are available.

The image composition apparatuses according to the third and fourth embodiments shown in FIGS. 15 and 16, respectively, are implemented are follows. The image generating unit, the photo image processing unit, the depth sorting unit, the mixing ratio calculating unit and the image composition unit (third embodiment), and the shape data dividing means, the image generating unit, the depth composition circuit, the mixing ratio calculating circuit and the pixel mixing circuit (fourth embodiment) are implemented by executing the image composition program according to control of a CPU or a DSP; the synchronous signal generator is implemented by a clock generator and a clock synchronizer; the shape data buffers, the buffers in the image generating unit, and 2-port memory in the depth composition circuit are implemented by main memories or auxiliary memories; and the image display unit is implemented by a monitor or a display. Further, the generated image may be stored in a memory or the like instead of displaying it on a monitor or the like and, in this case, the computer system can be used as an edition unit. Or, the generated image may be transmitted through a network system or the like for display or edition in a network computer or the like.

What is claimed is:

1. An image generation apparatus for generating a three-dimensional image based on shape data as a set of polygons, which is represented by three-dimensional coordinates, said apparatus comprising:

polygon identification device operable to identify each polygon by deciding whether or not it is opaque, for the shape data as the set of polygons;

image data calculating device operable to generate pixel values indicating luminance and color of respective pixels as display units of an image and depth values indicating depth with which polygons to be processed are displayed, calculate a degree of contribution from an area of a polygon in a pixel for the pixel belonging to the polygon which is identified opaque by said polygon identification device, and calculate a degree of contribution from a degree of transparency of a pixel for the pixel belonging to a polygon which is identified non-opaque by said polygon identification device;

temporal storage device operable to temporarily store the pixel values, the depth values, and the degrees of contribution which have been generated by said image data calculating device; and image composition device operable to calculate a mixing ratio of the respective pixels employing the degrees of contribution and the depth values temporarily stored in said temporal storage device, and mixing the respective pixel values temporarily stored in said temporal storage device based on the mixing ratio, to generate an image to be displayed.

2. The image generation apparatus of claim 1, wherein said temporal storage device stores plural depth values, said apparatus further comprising:

depth composition device operable to make a comparison between the largest depth value of the plural depth values and the depth value of the polygon to be processed, and deciding whether or not the polygon to be processed is displayed, according to the comparison result.

3. The image generation apparatus of claim 1, wherein said temporal storage device has plural regions, said apparatus further comprising:

buffer control device operable to control input/output of data to/from the plural regions in said temporal storage device.

4. The image generation apparatus of claim 1, wherein said image data calculating device divides one display pixel as a unit of the shape data into (M×M) sub-pixels (M≧2 M: positive integer), samples M sub-pixels from the (M×M) sub-pixels, and decides whether or not the sampled sub-pixels are in the polygon to be processed, to generate the degree of contribution.

5. The image generation apparatus of claim 4, wherein said image data calculating device selects the M sub-pixels to be sampled in such a way that they are not present on the same column and on the same row in a pixel.

6. The image generation apparatus of claim 5, wherein said image data calculating device samples sub-pixels in specific positions in all the polygons regardless of whether or not the polygons are opaque.

7. The image generation apparatus of claim 2, further comprising:

shape data dividing device operable to divide the shape data into plural polygon groups and output respective polygon groups as partial shape data; and wherein L (L: positive integer) pieces of the polygon identification means, L pieces of said image data calculating device, and L pieces of the depth composition device are provided; and wherein the L pieces of said depth composition device is connected in series, and said depth composition device sequentially transfers outputs from said depth composition device at a previous stage thereof to said depth composition device at a subsequent stage thereof.

8. The image generation apparatus of claim 7, wherein the L pieces of said depth composition device each arranges the outputs to be transferred to said depth composition device at the subsequent stage thereof in ascending order of the depth values.

9. An image generation method for generating a three-dimensional image based on shape data as a set of polygons, which is represented by three-dimensional coordinates, said method comprising:

identifying each polygon by deciding whether or not it is opaque, for the shape data as the set of polygons;

generating pixel values indicating luminance and color of respective pixels as display units of an image and depth values indicating depth with which polygons to be processed are displayed, calculating a degree of contribution from an area of a polygon in a pixel for the pixel belonging to the polygon which is identified opaque by said polygon identification, and calculating a degree of contribution from a degree of transparency of a pixel for the pixel belonging to a polygon which is identified non-opaque by said polygon identification;

temporarily storing the pixel values, the depth values, and the degrees of contribution which have been generated by said calculating; and calculating a mixing ratio of the respective pixels employing the degrees of contribution and the depth values temporarily stored in said temporarily storing, and mixing the respective pixel values temporarily stored in said temporarily storing based on the mixing ratio, to generate an image to be displayed.

10. An image generation program recording medium for recording an image generation program for generating a three-dimensional image based on shape data as a set of polygons, which is represented by three-dimensional coordinates, said program comprising:

identifying each polygon by deciding whether or not it is opaque, for the shape data as the set of polygons;

generating pixel values indicating luminance and color of respective pixels as display units of an image and depth values indicating depth with which polygons to be processed are displayed, calculating a degree of contribution from an area of a polygon in a pixel for the pixel belonging to the polygon which is identified opaque by said polygon identification, and calculating a degree of contribution from a degree of transparency of a pixel for the pixel belonging to a polygon which is identified non-opaque by said polygon identification;

temporarily storing the pixel values, the depth values, and the degrees of contribution which have been generated by said calculating; and calculating a mixing ratio of the respective pixels employing the degrees of contribution and the depth values temporarily stored in said temporarily storing, and mixing the respective pixel values temporarily stored in said temporarily storing based on the mixing ratio, to generate an image to be displayed.

11. An image composition apparatus for generating a three-dimensional image based on shape data as a set of polygons, which is represented by three-dimensional coordinates, and composing the generated image and a photo image, to generate a composite image, said apparatus comprising:

polygon identification device operable to identify each polygon by deciding whether or not it is opaque, for the shape data as the set of polygons;

image data calculating device operable to generate pixel values indicating luminance and color of respective pixels as display units of an image and depth values indicating depth with which polygons to be processed are displayed, calculate a degree of contribution from an area of a polygon in a pixel for the pixel belonging to the polygon which is identified opaque by said polygon identification device, and calculate a degree of contribution from a degree of transparency of a pixel for the pixel belonging to a polygon which is identified non-opaque by said identification device;

temporal storage device operable to store the pixel values, the depth values, and the degrees of contribution which have been generated by said image data calculating device;

photo image processing device operable to process the photo image to generate photo image pixel values indicating luminance and color, and degrees of contribution of the photo image indicating ratios of the photo image to pixels as display units; and image composition device operable to calculate a mixing ratio of the respective pixels employing the degrees of contribution and the depth values temporarily stored in said temporal storage device, the degrees of contribution of the photo image generated by said photo image processing device, and preset photo image depth values and mixing the respective pixel values temporarily stored in said temporal storage device with the photo image pixel values generated by said photo image processing device based on the mixing ratio, to generate an image to be displayed.

12. The image composition apparatus of claim 11, wherein said temporal storage device stores plural depth values, said apparatus further comprising:

depth composition device operable to make a comparison between the largest depth value of the plural depth values and the depth value of the polygon to be processed, and decide whether or not the polygon to be processed is displayed, according to the comparison result.

13. An image composition method for generating a three-dimensional image based on shape data as a set of polygons, which is represented by three-dimensional coordinates, and composing the generated image and a photo image, to generate a composite image, said method comprising:

identifying each polygon by deciding whether or not it is opaque, for the shape data as the set of polygons;

generating pixel values indicating luminance and color of respective pixels as display units of an image and depth values indicating depth with which polygons to be processed are displayed, calculating a degree of contribution from an area of a polygon in a pixel for the pixel belonging to the polygon which is identified opaque by said polygon identification, and calculating a degree of contribution from a degree of transparency of a pixel for the pixel belonging to a polygon which is identified non-opaque by said polygon identification;

temporarily storing the pixel values, the depth values, and the degrees of contribution which have been generated by said calculating;

processing the photo image to generate photo image pixel values indicating luminance and color, and degrees of contribution of the photo image indicating ratios of the photo image to pixels as display units; and calculating a mixing ratio of the respective pixels employing the degrees of contribution and the depth values temporarily stored in said temporarily storing, the degrees of contribution of the photo image generated by said photo image processing, and preset photo image depth values and mixing the respective pixel values temporarily stored in said temporarily storing with the photo image pixel values generated by said photo image processing based on the mixing ratio, to generate an image to be displayed.

14. An image composition program recording medium for recording an image composition program for generating a three-dimensional image based on shape data as a set of polygons, which is represented by three-dimensional coordinates, and compositing the generated image and a photo image, to generate a composite image, said program comprising:

identifying each polygon by deciding whether or not it is opaque, for the shape data as the set of polygons;

generating pixel values indicating luminance and color of respective pixels as display units of an image and depth values indicating depth with which polygons to be processed are displayed, calculating a degree of contribution from an area of a polygon in a pixel for the pixel belonging to the polygon which is identified opaque by said polygon identification, and calculating a degree of contribution from a degree of transparency of a pixel for the pixel belonging to a polygon which is identified non-opaque by said polygon identification;

temporarily storing the pixel values, the depth values, and the degrees of contribution which have been generated by said calculating;

processing the photo image to generate photo image pixel values indicating luminance and color, and degrees of contribution of the photo image indicating ratios of the photo image to pixels as display units; and calculating a mixing ratio of the respective pixels employing the degrees of contribution and the depth values temporarily stored in said temporarily storing, the degrees of contribution of the photo image generated by said photo image processing, and preset photo image depth values and mixing the respective pixel values temporarily stored in said temporarily storing with the photo image pixel values generated by said photo image processing based on the mixing ratio, to generate an image to be displayed.

* * * * *